(12) United States Patent
Kim et al.

(10) Patent No.: US 11,317,072 B2
(45) Date of Patent: Apr. 26, 2022

(54) DISPLAY APPARATUS AND SERVER, AND CONTROL METHODS THEREOF

(71) Applicant: SAMSUNG ELECTRONICS CO., LTD., Suwon-si (KR)

(72) Inventors: Yong-deok Kim, Seongnam-si (KR); Bo-eun Kim, Seoul (KR); Sung-hyun Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 16/100,434

(22) Filed: Aug. 10, 2018

(65) Prior Publication Data
US 2019/0058862 A1 Feb. 21, 2019

(30) Foreign Application Priority Data

Aug. 16, 2017 (KR) .................. 10-2017-0103678

(51) Int. Cl.
*H04N 13/117* (2018.01)
*H04N 13/194* (2018.01)
(Continued)

(52) U.S. Cl.
CPC ......... *H04N 13/117* (2018.05); *G06F 3/1446* (2013.01); *H04N 9/3147* (2013.01);
(Continued)

(58) Field of Classification Search
None
See application file for complete search history.

(56) References Cited

U.S. PATENT DOCUMENTS

| 2006/0164326 A1 | 7/2006 | Date |
| 2012/0194637 A1 | 8/2012 | Han et al. |

(Continued)

FOREIGN PATENT DOCUMENTS

| CN | 103339927 A | 10/2013 |
| CN | 105359075 A | 2/2016 |

(Continued)

OTHER PUBLICATIONS

International Search Report and Written Opinion dated Jan. 14, 2019, issued by the International Searching Authority in International Application No. PCT/KR2018/008791 (PCT/ISA/210 and PCT/ISA/237).

(Continued)

*Primary Examiner* — Kaitlin A Retallick
(74) *Attorney, Agent, or Firm* — Sughrue Mion, PLLC

(57) ABSTRACT

A display apparatus is provided. The display apparatus includes: an image processor configured to process an image signal; a display; and a processor configured to control the image processor to produce, from a 360-degree image, a plurality of split images to be arranged along a circumference within a predetermined region that includes a great circle of a sphere shape being mapped, based on a viewpoint corresponding to a user input, the plurality of split images corresponding to a plurality of screens, and to produce a projection image to be displayed on the display based on the viewpoint from the split image of the screen that corresponds to the display apparatus from among the plurality of split images.

22 Claims, 29 Drawing Sheets

(51) Int. Cl.
*H04N 21/218* (2011.01)
*H04N 9/31* (2006.01)
*G06F 3/14* (2006.01)

(52) U.S. Cl.
CPC ..... *H04N 13/194* (2018.05); *H04N 21/21805* (2013.01); *G09G 2320/068* (2013.01); *G09G 2340/12* (2013.01); *G09G 2356/00* (2013.01)

(56) References Cited

U.S. PATENT DOCUMENTS

| | | | |
|---|---|---|---|
| 2013/0181901 A1* | 7/2013 | West | G09G 5/14 345/161 |
| 2013/0222548 A1 | 8/2013 | Yang et al. | |
| 2014/0168375 A1 | 6/2014 | Morimura et al. | |
| 2014/0267593 A1* | 9/2014 | Kim | H04N 1/3876 348/36 |
| 2016/0132991 A1* | 5/2016 | Fukushi | G06T 3/40 345/667 |
| 2017/0052752 A1* | 2/2017 | Ogawara | H04N 9/3147 |
| 2018/0374192 A1* | 12/2018 | Kunkel | G06T 3/0087 |

FOREIGN PATENT DOCUMENTS

| | | |
|---|---|---|
| JP | 2006-211164 A | 8/2006 |
| KR | 10-2015-0123611 A | 11/2015 |
| KR | 10-2016-0052095 A | 5/2016 |

OTHER PUBLICATIONS

Communication dated Jul. 30, 2020, issued by the European Patent Office in European Application No. 18845579.4.
Communication dated Apr. 29, 2020, issued by the European Patent Office in counterpart European Application No. 18845579.4.
Communication dated Mar. 12, 2021, issued by the Korean Intellectual Property Office in Korean Application No. 10-2017-0103678.
Communication dated Apr. 25, 2021, from the China National Intellectual Property Administration in Application No. 201880052879.0.
Communication dated Nov. 16, 2021 issued by the European Patent Office in European Application No. 18 845 579.4.
Communication dated Dec. 23, 2021 issued by the China National Intellectual Property Administration in Chinese Application No. 201880052879.0.

* cited by examiner

FIG. 10

$$140 \sim \begin{bmatrix} x' \\ y' \\ z' \\ 1 \end{bmatrix} = P \cdot M \cdot R' \cdot \begin{bmatrix} x \\ y \\ z \\ 1 \end{bmatrix}$$

$$141 \sim R' = \begin{bmatrix} \cos(\theta_0) & 0 & -\sin(\theta_0) & 0 \\ 0 & 1 & 0 & 0 \\ \sin(\theta_0) & 0 & \cos(\theta_0) & 0 \\ 0 & 0 & 0 & 1 \end{bmatrix} \cdot \begin{bmatrix} 1 & 0 & 0 & 0 \\ 0 & \cos(\varphi_0) & \sin(\varphi_0) & 0 \\ 0 & -\sin(\varphi_0) & \cos(\varphi_0) & 0 \\ 0 & 0 & 0 & 1 \end{bmatrix}$$

$$142 \sim M = \begin{bmatrix} \cos(\Delta\theta) & 0 & -\sin(\Delta\theta) & 0 \\ 0 & 1 & 0 & 0 \\ \sin(\Delta\theta) & 0 & \cos(\Delta\theta) & 0 \\ 0 & 0 & 0 & 1 \end{bmatrix} \cdot \begin{bmatrix} 1 & 0 & 0 & 0 \\ 0 & \cos(\Delta\varphi) & \sin(\Delta\varphi) & 0 \\ 0 & -\sin(\Delta\varphi) & \cos(\Delta\varphi) & 0 \\ 0 & 0 & 0 & 1 \end{bmatrix}$$

DISPLAY APPARATUS AND SERVER, AND CONTROL METHODS THEREOF

CROSS-REFERENCE TO RELATED APPLICATION

This application is based on and claims priority under 35 U.S.C. § 119 to Korean Patent Application No. 10-2017-0103678, filed on Aug. 16, 2017, in the Korean Intellectual Property Office, the disclosure of which is incorporated by reference herein in its entirety.

BACKGROUND

1. Field

The disclosure relates to a display apparatus and a server, and control methods thereof, and more particularly to a display apparatus and a server, which control a 360-degree image on multi-screens, and control methods thereof.

2. Description of the Related Art

With recent increasing interest in virtual reality (VR) and release of various personal photographing devices, production of 360-degree content for broadcast, movies or the like has been rapidly on the rise. Such 360-degree content is displayable through not only a head mounted display (HMD) but also various devices such as a personal computer (PC), a television (TV), a smart phone, etc.

The 360-degree content enables a viewer to experience omnidirectional views. In particular, when a viewer watches the 360-degree content through multi-screens, the viewer can be immersed in a watching experience through a wide view angle.

In the related art, to display a panoramic image on the multi-screens, a corresponding image is received and displayed in accordance with information of a display from a source device. However, a method of controlling the panoramic image in response to viewpoint movement and zoom instruction has not been proposed.

Further, when the 360-degree image is reproduced through the single screen of the existing HMD, TV, smartphone, PC, etc., a projection image is displayed in accordance with longitude and latitude of a viewpoint as the viewpoint moves. However, when this method is used in moving the viewpoint on the multi-screens, there is an overlapping region of an image displayed on each individual screen.

SUMMARY

Provided are a display apparatus and a server, which control a 360-degree image on multi-screens, and control methods thereof.

Also provided are a display apparatus and a server, which maintain seamless connection between regions displayed on screens even though a viewpoint and a view angle are changed based on user control in case of reproducing a 360-degree image on multi-screens, and control methods thereof.

In accordance with an aspect of the disclosure, there is provided a display apparatus comprising: an image processor configured to process an image signal; a display; and a processor configured to control the image processor to produce, from a 360-degree image, a plurality of split images to be arranged along a circumference within a predetermined region that includes a great circle of a sphere shape being mapped and corresponding to a plurality of screens, based on a viewpoint corresponding to a user input, and to produce a projection image to be displayed on the display based on the viewpoint from the split image of the screen corresponding to the display apparatus from among the plurality of split images.

Thus, according to an embodiment, it is possible to control the 360-degree image on the multi-screens. Further, when the 360-degree image is reproduced on the multi-screens, it is possible to seamlessly connect the regions displayed on the screens even though the viewpoint and the view angle are changed by a user's control.

The processor may obtain a view angle of the split image based on a number of a plurality of screens and a position at which the screen of the display apparatus is arranged. Thus, it is possible to determine a position to which the split image provided to each screen is mapped along the great circle of the sphere.

The display apparatus further comprises an input receiver configured to receive a user input, wherein: the processor may transmit control information based on the received user input to each of the plurality of display apparatuses corresponding to the plurality of screens, and the control information may comprise at least one of information about a change in the view angle, and information about a pitching rotation angle or a yawing rotation angle. Thus, when a user controls the 360-degree image through the remote controller or the like, the control information of the remote controller received in the main screen can be transmitted to another screen, and thus control operations are organically implemented in the screens.

The processor may set a control reference point with regard to the screen of the display apparatus based on a user input, and may obtain a center point of each respective projection image displayed on each corresponding screen based on a set position of the control reference point. Thus, a user can set a reference position with regard to the main screen in order to control the 360-degree image on the multi-screens.

The processor may change the position at which the respective projection image is displayed based on the information about a change of the viewpoint of the control reference point and the angular distance of the center point of each screen from the control reference point when the respective projection image is subjected to pitching or yawing rotation based on a user input. Thus, the rotation angle and rotation direction of the great circle are taken into account at pitching or yawing rotation control, and therefore images displayed on the screens are seamlessly connected without an overlapping or lost region.

The processor may adjust a view angle of the respective projection image displayed on each screen so that the plurality of screens can have a constant total range of the view angle, when the respective projection image is subjected to zoom control based on a user input. Thus, the total range of the view angle is maintained at zoom-in or zoom-out control, and therefore an image can be displayed without losing a major object in the screen.

In accordance with an aspect of the disclosure, there is provided a display apparatus comprising: an image processor configured to process an image signal; a display; and a processor configured to control the image processor to select a plurality of display apparatuses to be connected on a network based on a user input, to produce, from a 360-degree image, a plurality of split images corresponding to viewpoints of screens of the plurality of selected display apparatuses, and to map each of the produced split images to a sphere shape.

Thus, a user can directly select the multi-screens for reproducing the 360-degree image from among peripheral apparatuses.

The processor may be configured to display a user interface (UI) for setting a respective position of the sphere shape to which each respective split image corresponding to each screen of the plurality of selected display apparatuses is mapped. Thus, when a user directly selects the multi-screens for reproducing the 360-degree image, it is also possible to designate an arranged position of each screen.

The processor may be further configured to display a UI for showing images of apparatuses arranged in a surrounding space of a user, and to select the plurality of display apparatuses based on a user input to the UI. Thus, a user can more easily select apparatuses through the UI displayed on the screen to select the multi-screens for reproducing the 360-degree image.

In accordance with an aspect of the disclosure, there is provided a computer program product comprising: a memory configured to store an instruction; and a processor, wherein, when executed by the processor, the instruction causes the computer to implement a method that includes: producing, from a 360-degree image, a plurality of split images to be arranged along a circumference within a predetermined region that includes a great circle of a sphere shape being mapped and corresponding to a plurality of screens, based on a viewpoint corresponding to a user input, and producing a projection image to be displayed based on the viewpoint from the split image of the screen corresponding to the display apparatus from among the plurality of split images. The computer program product may be implemented as a non-transitory computer readable storage medium storing a computer program that includes the instruction.

In accordance with an aspect of the disclosure, there is provided a server comprising: a communication interface configured to communicate with a plurality of display apparatuses; and a processor configured to control the communication interface to produce, from a 360-degree image, a plurality of split images to be arranged along a circumference within a predetermined region comprising a great circle of a sphere shape being mapped and corresponding to respective screens of a plurality of display apparatuses, and to transmit the plurality of produced split images to the corresponding display apparatuses.

Thus, according to an embodiment, it is possible to control the 360-degree image on the multi-screens. Further, when the 360-degree image is reproduced on the multi-screens, it is possible to seamlessly connect the regions displayed on the screens even though the viewpoint and the view angle are changed by a user's control.

The processor may be further configured to receive information about a number of screens of the plurality of display apparatuses and a position at which each of the plurality of screens is arranged, and to produce the plurality of split images based on the received information. Thus, it is possible to determine a position to which the split image provided to each screen is mapped along the great circle of the sphere.

In accordance with an aspect of the disclosure, there is provided a computer program product comprising: a memory configured to store an instruction; and a processor, wherein, when executed by the processor, the instruction causes the computer to implement a method that includes: producing, from a 360-degree image, a plurality of split images to be arranged along a circumference within a predetermined region comprising a great circle of a sphere shape being mapped and corresponding to a screens of the plurality of display apparatuses, and transmitting each of the plurality of produced split images to the corresponding display apparatuses. The computer program product may be implemented as a non-transitory computer readable storage medium storing a computer program that includes the instruction.

According to an exemplary embodiment, there is provided a method of controlling a display apparatus, comprising: producing, from a 360-degree image, a plurality of split images to be arranged along a circumference within a predetermined region comprising a great circle of a sphere shape being mapped and corresponding to a plurality of screens, based on a viewpoint corresponding to a user input; and producing a projection image to be displayed on the display based on the viewpoint from the split image of the screen corresponding to the display apparatus from among the plurality of split images.

Thus, according to an embodiment, it is possible to control the 360-degree image on the multi-screens. Further, when the 360-degree image is reproduced on the multi-screens, it is possible to seamlessly connect the regions displayed on the screens even though the viewpoint and the view angle are changed by a user's control.

The method further comprises obtaining a view angle of the split image based on a number of the plurality of screens and a position at which the screen of the display apparatus among the plurality of screens is arranged. Thus, it is possible to determine a position to which the split image provided to each screen is mapped along the great circle of the sphere.

In accordance with an aspect of the disclosure, there is provided a method of controlling a display apparatus, comprising: selecting a plurality of display apparatuses to be connected on a network based on a user input; producing, from a 30-degree image, a plurality of split images corresponding to viewpoints of screens of the plurality of selected display apparatuses; and mapping each of the produced split images to a sphere shape.

Thus, a user can directly select the multi-screens for reproducing the 360-degree image from among peripheral apparatuses.

The method further comprises displaying a user interface (UI) for setting a position of the sphere shape to which the split image corresponding to each screen of the plurality of selected display apparatuses is mapped, based on a user input. Thus, when a user directly selects the multi-screens for reproducing the 360-degree image, it is also possible to designate an arranged position of each screen.

The method may further comprises: displaying a UI for showing images of apparatuses arranged in a surrounding space of a user; and selecting the plurality of display apparatuses based on a user input to the UI. Thus, a user can more easily select apparatuses through the UI displayed on the screen in order to select the multi-screens for reproducing the 360-degree image.

In accordance with an aspect of the disclosure, there is provided a method of controlling a server, comprising: producing, from a 360-degree image, a plurality of split images to be arranged along a circumference within a predetermined region comprising a great circle of a sphere shape being mapped and corresponding to a screens of the plurality of display apparatuses; and transmitting each of the plurality of produced split images to the corresponding display apparatuses.

Thus, according to an embodiment, it is possible to control the 360-degree image on the multi-screens. Further, when the 360-degree image is reproduced on the multi-screens, it is possible to seamlessly connect the regions displayed on the screens even though the viewpoint and the view angle are changed by a user's control.

The method may further comprises: receiving information about a number of screens of the plurality of display apparatuses and a position at which each of the plurality of screens is arranged; and producing the plurality of split images corresponding to the plurality of screens based on the received information. Thus, it is possible to determine a position to which the split image provided to each the screen is mapped along the great circle of the sphere.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 illustrates a formula to calculate coordinates of a projection image for each screen arranged on a great circle of a sphere at rotation control, according to an embodiment;

DETAILED DESCRIPTION OF EXEMPLARY EMBODIMENTS

Hereinafter, exemplary embodiments will be described in detail with reference to accompanying drawings so as to be easily realized by a person having ordinary skill in the art. The present disclosure may be materialized in various different forms and not limited to the embodiments set forth herein.

Herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
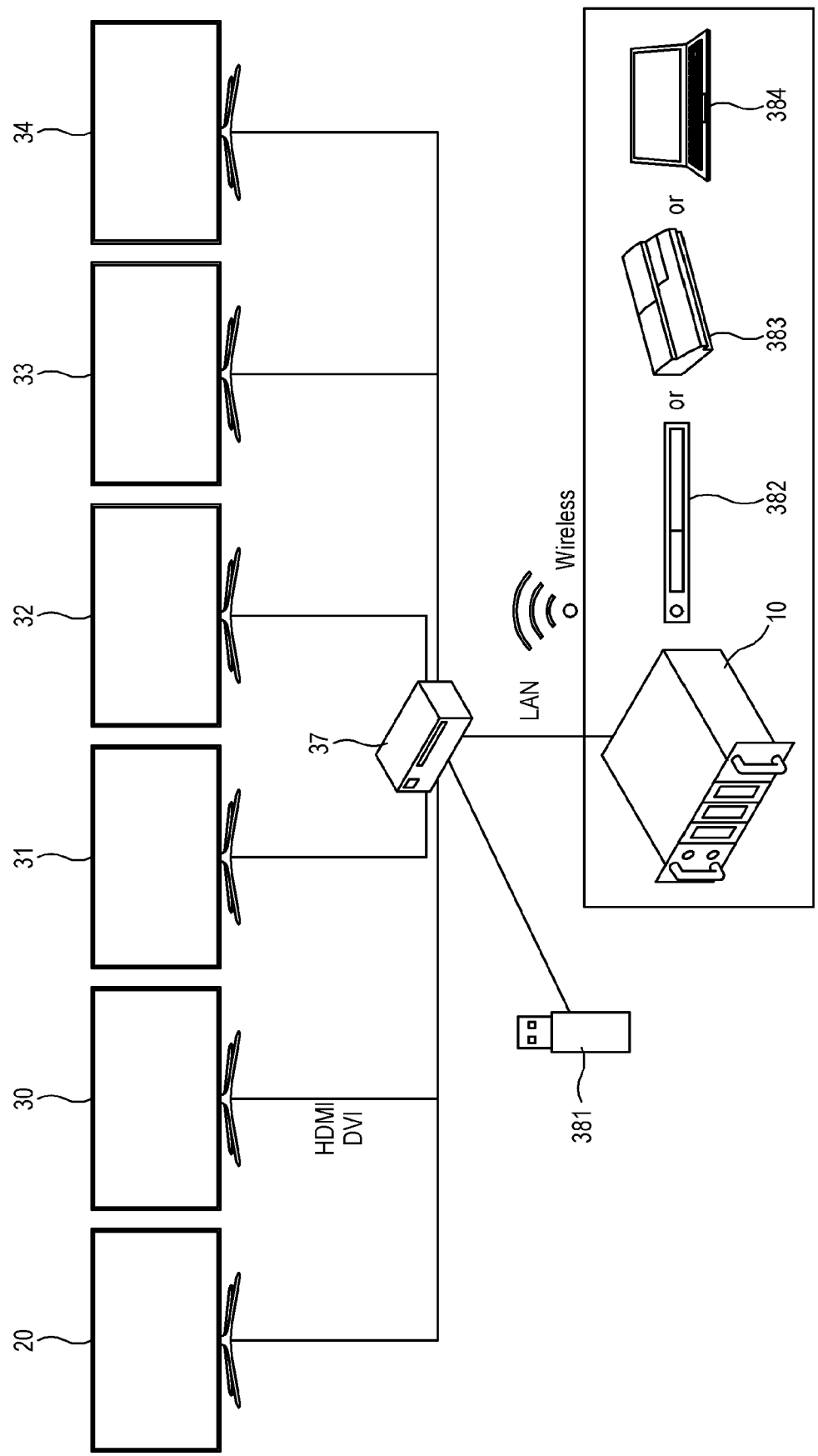
FIG. 1 illustrates a configuration between a server and a plurality of display apparatuses, according to an embodiment.

FIG. 1 illustrates a configuration between a server and a plurality of display apparatuses, according to an embodiment. As shown in FIG. 1, a server 10 is connected to a splitter 37, and a plurality of display apparatuses 20, 30, 31, 32, 33 and 34 are connected in parallel to the splitter 37. The server 10 communicates with the splitter 37 via a local area network (LAN) or another wired communication method, or via a wireless communication method, and content and information of a 360-degree image (refer to item '950' in FIG. 2) are transmitted and received between the server 10 and the splitter 37. In this aspect, the 360-degree image 950 is produced by stitching two or more images respectively photographed by two or more lenses, and is thus viewable in all directions.

The splitter 37 communicably connects with each of the plurality of display apparatuses 20, 30, 31, 32, 33 and 34 via a high-definition multimedia interface (HDMI) or a digital visual interface (DVI).

The server 10 produces a plurality of split images (for example, split images 91, 92, 93, . . . in FIG. 2) corresponding to viewpoints of the plurality of display apparatuses 20, 30, 31, 32, 33 and 34 from each frame of the 360-degree image 950 received from an external source or stored in a memory.

The splitter 37 receives the produced split images 91, 92, 93, . . . of the 360-degree image 950 from the server 10, and distributively transmits each of the plurality of received split images 91, 92, 93, . . . to the corresponding display apparatuses 20, 30, 31, 32, 33 and 34.

Alternatively, the splitter 37 may communicably connect with a universal serial bus (USB) device 381 in which the 360-degree image 950 is stored. In this case, the splitter 37 receives the 360-degree image 950 stored in the USB device 381, performs a process of producing the plurality of split images 91, 92, 93, . . . which respectively correspond to the plurality of display apparatuses 20, 30, 31, 32, 33 and 34 from each frame of the 360-degree image 950, and distributively transmits each of the produced split images 91, 92, 93, . . . to the corresponding display apparatuses 20, 30, 31, 32, 33 and 34.

Further, the splitter 37 may communicably connect with any one or more of a Blu-ray disc player 382, a game playing device 383, a laptop computer 384, etc., and receive and distributively transmit the 360-degree image 950 stored therein or a plurality of previously processed split images 91, 92, 93, . . . from them to the display apparatuses 20, 30, 31, 32, 33 and 34.

Figure 2:
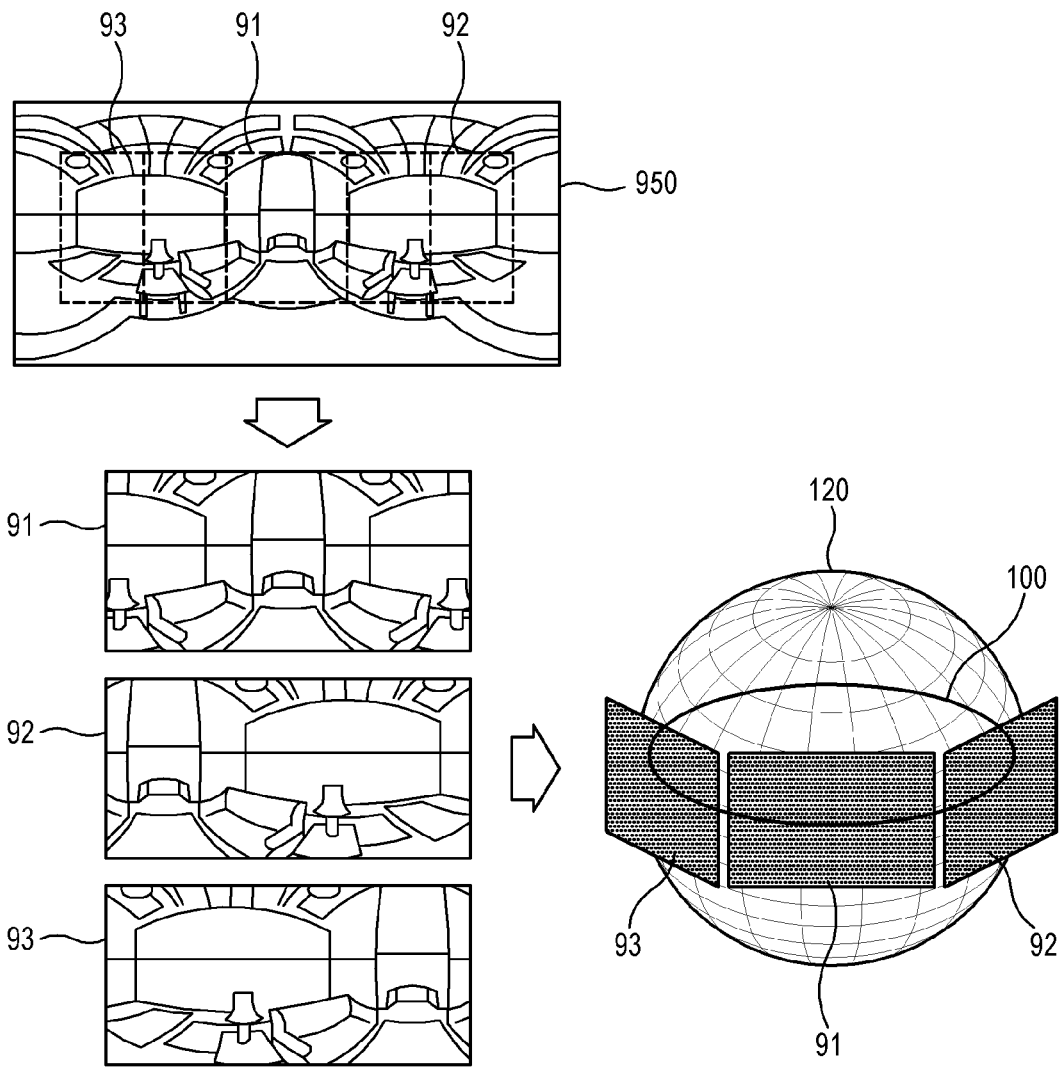
FIG. 2 illustrates an example of mapping split images generated from a 360-degree image along a great circle of a sphere, according to an embodiment.

FIG. 2 illustrates an example of mapping split images generated from a 360-degree image along a great circle of a sphere, according to an embodiment. As shown in FIG. 2, the server 10 produces the split images 91, 92, 93, . . . corresponding to the screens of the plurality of display apparatuses 20, 30, 31, . . . from the 360-degree image 950.

The server 10 causes the split images 91, 92, 93 . . . to be arranged along a great circle of a sphere 120 mapping to the plurality of display apparatuses 20, 30, 31, . . . when producing the split images 91, 92, 93, . . . . In particular, the great circle 100 refers to a circumference of a circle created when the sphere 120 is cut passing through the center point thereof.

According to an embodiment, the server 10 may cause the split images 91, 92, 93, . . . to be arranged along a circumference within a predetermined region that includes the great circle 100 of the sphere 120 mapping to the plurality of display apparatuses 20, 30, 31, . . . when producing the split images 91, 92, 93, . . . . In particular, when the split images 91, 92, 93, . . . are mapped to the sphere 120, one way of securing connectivity of images displayed on the screens is to arrange the images along the great circle 100. However, another way may be to arrange the images along a circumference positioned at a relatively close distance from the great circle 100.

The display apparatuses 20, 30, 31, . . . use a central processing unit (CPU) or a graphic processing unit (GPU) to cause the split images 91, 92, 93, . . . received from the server 10 to be texture-mapped along the great circle of the sphere 120. In this case, the display apparatuses 20, 30, 31, . . . determine a respective view angle of each of the split images 91, 92, 93, . . . based on a total number of screens and a position at which the screen of the corresponding display apparatus is arranged within an entire screen.

For example, when a total number of screens is six (6) and a certain screen within the entire screen is positioned at the third from the left, the split image corresponding to the certain screen may have a view angle of 60 degrees and the view angle may range from 120 degrees to 180 degrees within the whole range of 360 degrees on the great circle of the sphere.

As described above, an operation of determining the respective view angle of each split image to be mapped along the great circle of the sphere may be performed in the server 10 in accordance with connection structures of the plurality of display apparatuses 20, 30, 31, . . . or may be performed in the corresponding display apparatus.

In this aspect, when the plurality of display apparatuses 20, 30, 31, . . . are connected in parallel to the server 10, the server 10 may determine the respective view angle of the split image corresponding to each screen and provide information about the determined view angle to the corresponding display apparatus.

Alternatively, when the plurality of display apparatuses 20, 30, 31, . . . are connected in series to the server 10, each of the display apparatuses 20, 30, 31, . . . may determine the respective view angle of the split image corresponding to its own screen.

According to an embodiment, the display apparatuses 20, 30, 31, . . . may directly set the view angles of the split images corresponding to their own screens in response to a user input. In this case, unlike the case of setting the view angle of the split image uniformly by taking the total number of screens into account, a user may set a certain screen to have a larger or smaller view angle of a split image than those of the other screens.

Figure 3:
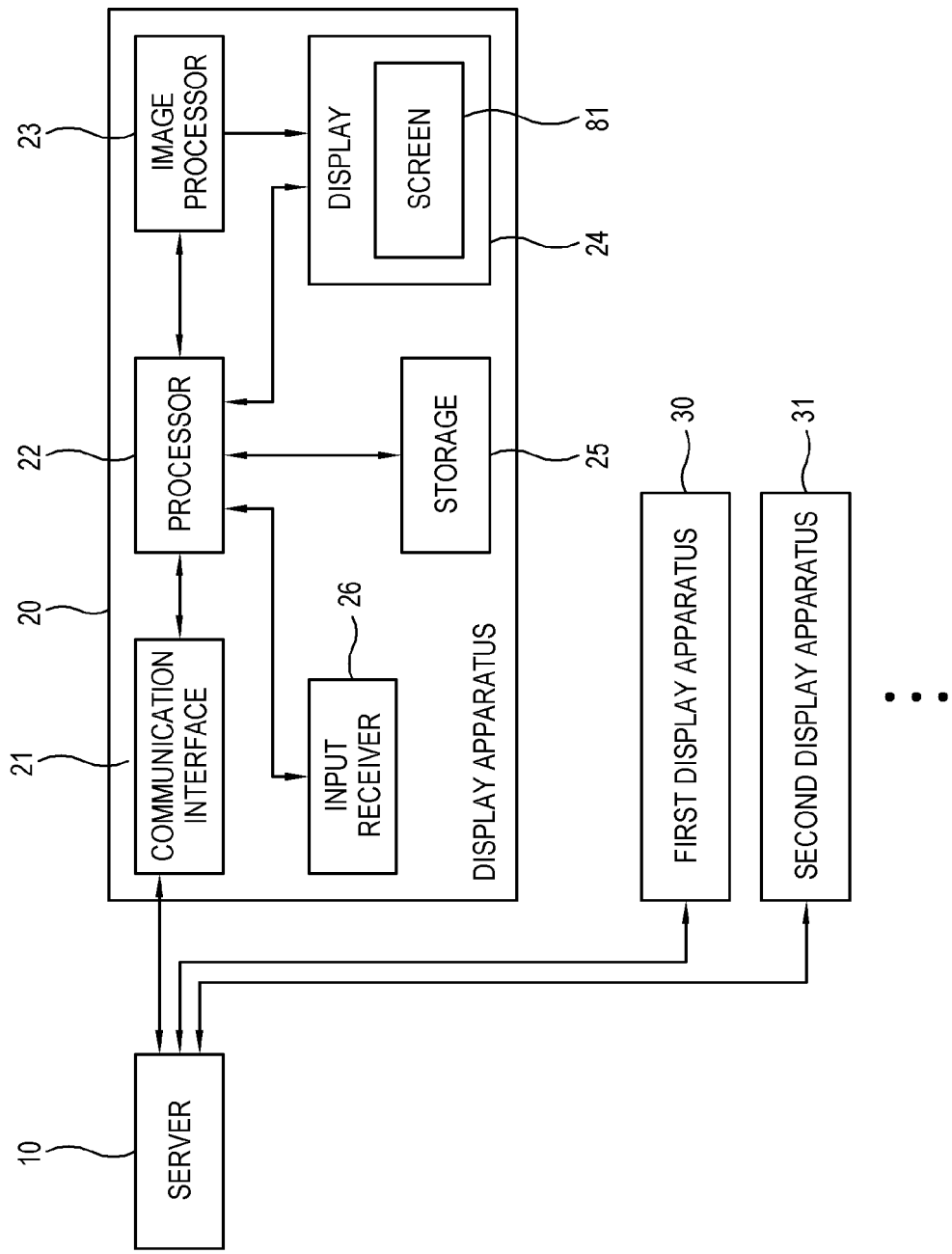
FIG. 3 is a block diagram of a display apparatus, according to an embodiment.

FIG. 3 is a block diagram of a display apparatus, according to an embodiment. The display apparatus 20 includes a communication interface 21, a processor 22, an image processor 23, a display 24, a storage 25 and an input receiver 26, and communicates with a server 10 and a plurality of display apparatuses 30, 31, . . . via the communication interface 21. In this case, the display apparatus 20 and the plurality of display apparatuses 30, 31 . . . are connected in parallel to the server 10. The display apparatus 20 may for example include a television (TV), a smartphone, a projector, a head-mounted display (HMD), etc. There are no limits to the elements of the display apparatus 20, and the display apparatus 20 may include another element.

The display apparatus 20 is connected to and synchronized with the plurality of display apparatuses 30, 31, . . . via a network, and may operate as a main apparatus to be controlled by a user to reproduce and control the 360-degree image 950.

The communication interface 21 may be a transceiver the communicates with the server 10 using a wireless communication method or a wired communication method. The communication interface 21 may communicate with the server 10 by a wired communication method such as Ethernet, etc., or communicate with the server 10 via a wireless router by a wireless communication method such as wireless fidelity (Wi-Fi), Bluetooth, etc. There are no limits to the communication method of the communication interface 21, and the communication interface 21 may use another communication method.

According to an embodiment, the communication interface 21 may be not directly connected to the server 10, but may instead be connected to the splitter 37 as shown in FIG. 1. In this case, the communication interface 21 may receive data, which is routed by the splitter 37, from the server 10 via the splitter 37.

The input receiver 26 is configured to receive a user's input for controlling at least one function of the display apparatus 20. For example, the input receiver 26 may receive a user's input for selecting a part of a user interface (UI) displayed on the display 24. The input receiver 26 may be provided as an input panel provided outside the display apparatus 20 or as a remote controller capable of performing infrared communication with the display apparatus 20. Further, the input receiver 26 may be implemented as a keyboard, a mouse, etc. connected to the display apparatus 20, and may be implemented as a touch screen provided on the display apparatus 20.

The storage 25 is configured to store a split image 91 received from the server 10. The split image 91 is obtained by partitioning a region that corresponds to a view angle of a screen 81 from the whole region of the 360-degree image 950. The storage 25 causes the data of the stored split image 91 to undergo reading, writing, edition, deleting, update, etc. The storage 25 may be implemented as a nonvolatile memory such as a flash memory, a hard disk drive, etc. in order to retain data regardless of whether the display apparatus 20 is powered on or off.

The image processor 23 performs imaging processing functions with regard to the split image 91 stored in the storage 25. Further, the image processor 23 performs imaging processing functions with regard to a projection image (see item '812' in FIG. 21) produced in correspondence with the viewpoint of the screen 81 from the split image 91 mapped onto the great circle 100 of the sphere 120. As examples of the imaging processing functions performed in the image processor 23, these functions may include any one or more of demultiplexing, decoding, de-interlacing, scaling, noise reduction, detail enhancement, etc. without limitations. The image processor 23 may be implemented as a system on chip (SOC) where many functions are integrated, or as individual elements for independently performing each function.

The display 24 includes a screen 81, which displays an image based on an image signal processed by the image processor 23. There are no limits to the types of the display 24, and the display 24 may be implemented as any of various types such as a plasma display panel (PDP), a liquid crystal display (LCD), an organic light emitting diode (OLED), a flexible display, etc.

The processor 22 receives the split image 91 produced from each frame of the 360-degree image including the plurality of frames based on a viewpoint in response to a user input received from the input receiver 26.

In particular, the processor 22 receives the split image 91, which is produced to be arranged along the great circle 100 of the sphere 120 mapping to the display apparatus 20, from the server 10. In this case, the view angle of the split image 91 may be determined by considering a total number of screens and a relative position where the screen 81 is positioned within the entire screen. The processor 22 may include at least one central processing unit (CPU) and/or at least one microprocessor.

The processor 22 controls the image processor 23 to map the split image 91 received from the server 10 onto the great circle 100 of the sphere 120, and causes a projection image 812 to be produced based on a viewpoint from the mapped split image 91 and displayed on the display 24.

According to an embodiment, the foregoing operations of the processor 22 may be implemented by a computer program stored in a computer program product provided separately from the display apparatus 20.

In this case, the computer program product includes a memory in which an instruction corresponding to the computer program is stored, and a processor. When executed by the processor, the instruction causes a computer to receive the split image 91 of the screen 81 corresponding to the display apparatus 20 among the plurality of split images 91, 92, 93, . . . which is produced, from the 360-degree image 950, to be arranged along the great circle 100 of the sphere 120 being mapped and corresponding to the plurality of screens, based on a viewpoint according to a user input, and to produce and display the projection image 812 based on the viewpoint from the received split image 91.

Thus, the display apparatus 20 may download and execute a computer program stored in a separate computer program product, and perform the operations of the processor 22.

Figure 4:
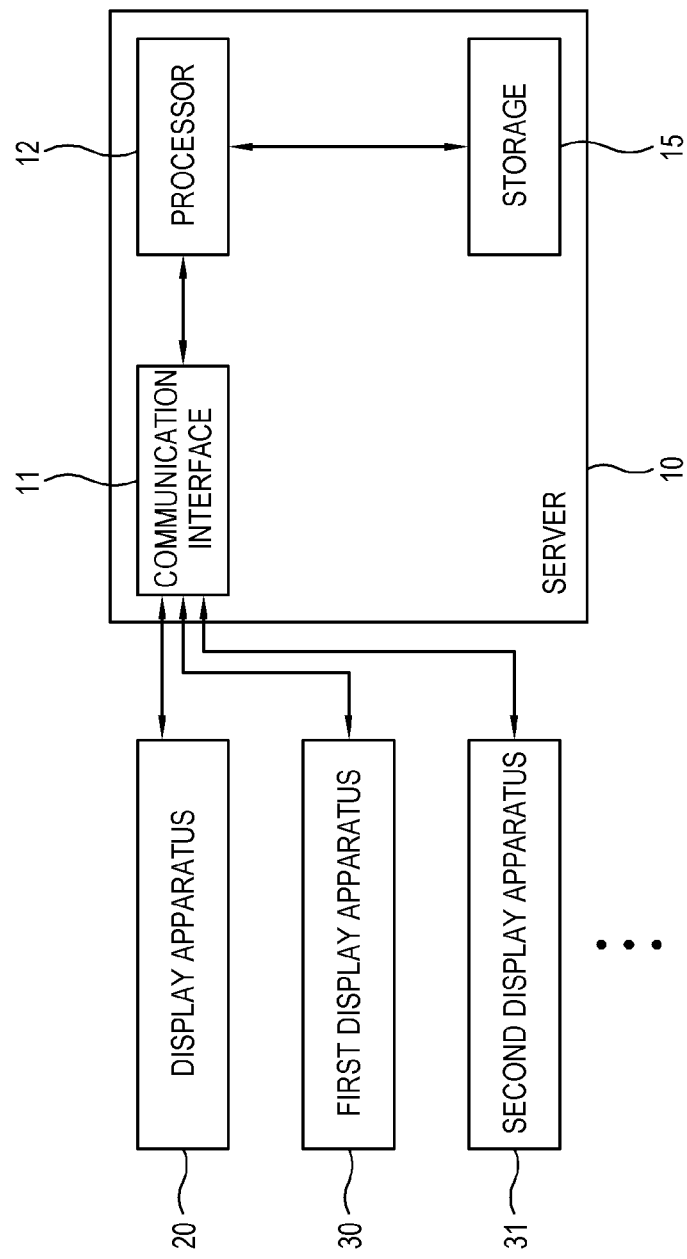
FIG. 4 is a block diagram of a server, according to an embodiment.

FIG. 4 is a block diagram of a server, according to an embodiment. As shown in FIG. 4, the server 10 includes a communication interface 11, a processor 12, and a storage 15, and communicates with the plurality of display apparatuses 20, 30, 31, . . . via the communication interface 11. In this case, the plurality of display apparatuses 20, 30, 31, . . . are connected in parallel to the server 10. However, there are no limits to the configuration of the server 10. For example, when a display apparatus is provided as the server 10, the server 10 may further include any of an image receiver, an image processor, and/or a display.

The communication interface 11 communicates with the plurality of display apparatuses 20, 30, 31, . . . by a wireless or wired communication method. The communication interface 11 may communicate with the plurality of display apparatuses 20, 30, 31, . . . by the wired communication method such as Ethernet, etc., or communicate with the plurality of display apparatuses 20, 30, 31, . . . via a wireless router by the wireless communication method such as Wi-Fi, Bluetooth, etc. There are no limits to the communication method of the communication interface 21, and the communication interface 21 may use another communication method.

According to an embodiment, the communication interface 11 may not directly communicate with the plurality of display apparatuses 20, 30, 31, . . . , but may instead be connected to the splitter 37 as shown in FIG. 1. In this case, the communication interface 11 may transmit data to the splitter 37, so that the splitter 37 can split the data and transmit the split data to the plurality of display apparatuses 20, 30, 31, . . . .

The storage 15 is configured to store the 360-degree image 950 received from an external device. The storage 15 causes each piece of the data of the stored 360-degree image 950 to undergo any one or more of reading, writing, editing, deleting, update, etc. The storage 15 may be implemented as a nonvolatile memory such as a flash memory, a hard disk drive, etc. in order to retain data regardless of whether the display apparatus 20 is powered on or off.

The processor 12 produces a plurality of split images 91, 92, 93, . . . corresponding to each of a plurality of screens (see screens 81, 82, 83, . . . of FIG. 21) to be arranged along the mapping great circle 100 of the sphere 120 in the plurality of display apparatuses 20, 30, 31, from each frame of the 360-degree image 950 that includes the plurality of frames.

In this case, the 360-degree image 950 may be stored in the storage 15, or may, for example, be received from the Blu-ray disc 382, the game playing device 383, the laptop computer 384, and the like connected to the server 10.

According to an embodiment, the processor 12 may receive information about the number of screens corresponding to the plurality of display apparatuses 20, 30, 31, . . . and respective positions where the plurality of screens are respectively arranged from each of the display apparatuses 20, 30, 31, . . . or from the display apparatus 20 that includes the main screen which is being controlled by a user. Alternatively, the processor 12 may receive information about a total number of screens and an arranged position of each screen via a user input to the remote controller or the like.

The processor 12 transmits each respective one of the plurality of split images 91, 92, 93, . . . generated according to frames to the corresponding display apparatuses 20, 30, 31, . . . .

According to an embodiment, the foregoing operations of the processor 12 may be implemented by a computer program stored in a computer program product provided separately from the server 10.

In this case, the computer program product includes a memory in which an instruction corresponding to the computer program is stored, and a processor. When executed by the processor, the instruction causes the server 10 to produce the plurality of split images 91, 92, 93, . . . corresponding to the screens of the plurality of display apparatuses 20, 30, 31, . . . to be arranged along the mapping great circle 100 of the sphere 120, from the 360-degree image 950, and transmit the plurality of produced split images 91, 92, 93, . . . to the display apparatuses 20, 30, 31, . . . .

Thus, the server 10 may download and execute a computer program stored in a separate computer program product, and perform the operations of the processor 12.

Figure 5:
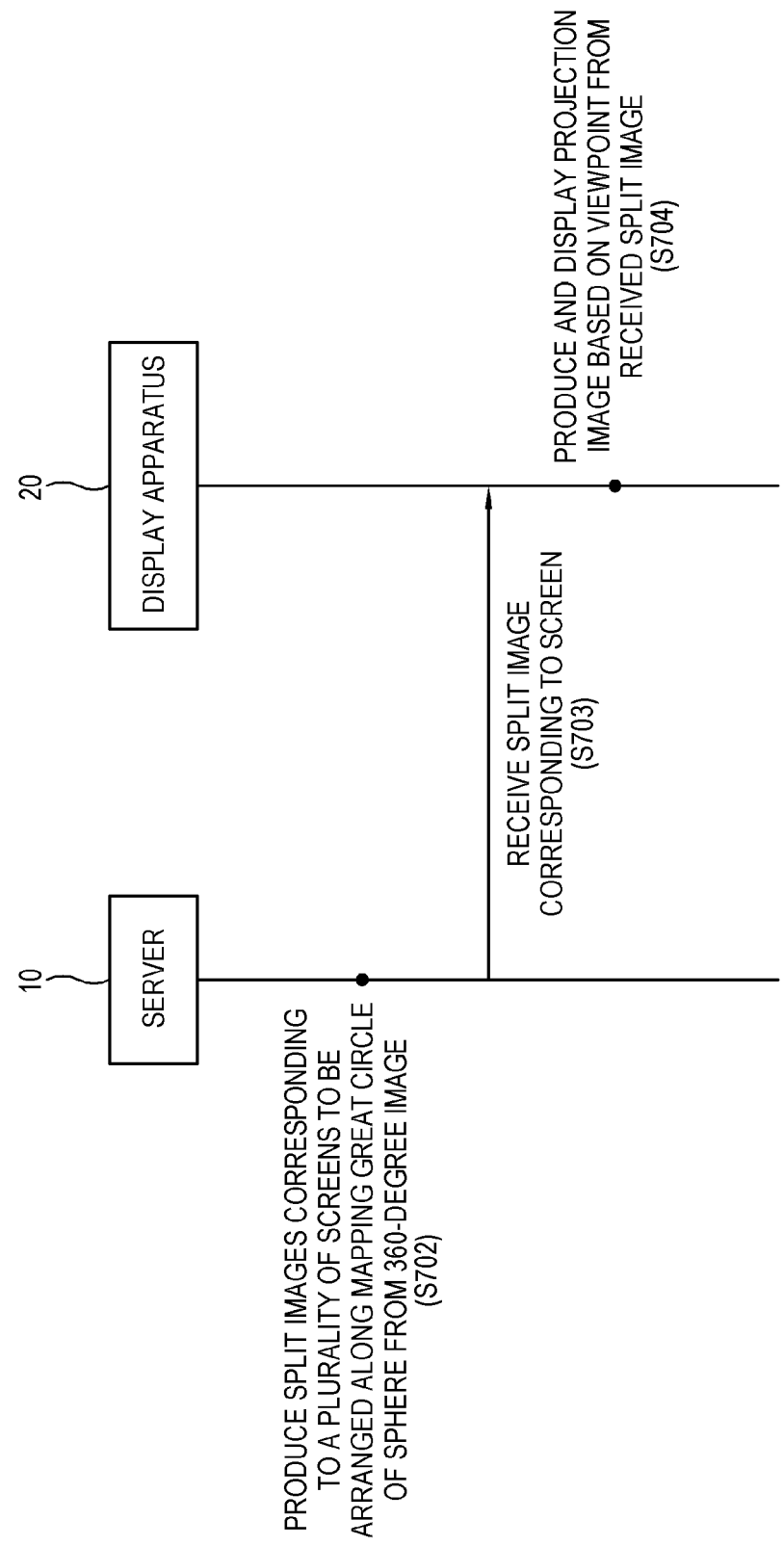
FIG. 5 is a flowchart of operations between a server and a display apparatus, according to an embodiment.

FIG. 5 is a flowchart of operations between a server and a display apparatus, according to an embodiment. As shown in FIG. 5, at operation S702, the server 10 produces the split images 91, 92, 93, . . . corresponding to a plurality of screens 81, 82, 83, . . . to be arranged along the mapping great circle 100 of the sphere 120, from the 360-degree image 950.

In this aspect, the operation S702 may include an operation of receiving information about a total number of a plurality of screens 81, 82, 83, . . . and respective positions at which the plurality of screens 81, 82, 83, . . . are arranged, and an operation of producing the plurality of split images 91, 92, 93, . . . by determining respective view angles corresponding to the screens 81, 82, 83, . . . based on the received information.

Next, at operation S703, the display apparatus 20 receives the split image 91 that corresponds to the screen 81 from the server 10.

Last, at operation S704, the display apparatus 20 produces and displays the projection image 812 (referring also to FIG. 9) based on the viewpoint from the received split image 91.

The operation S704 further includes operations of mapping the split image 91 to a corresponding region on the great circle 100 of the sphere 120, and producing a projection image that corresponds to the viewpoint from the mapped split image 91.

Figure 6:
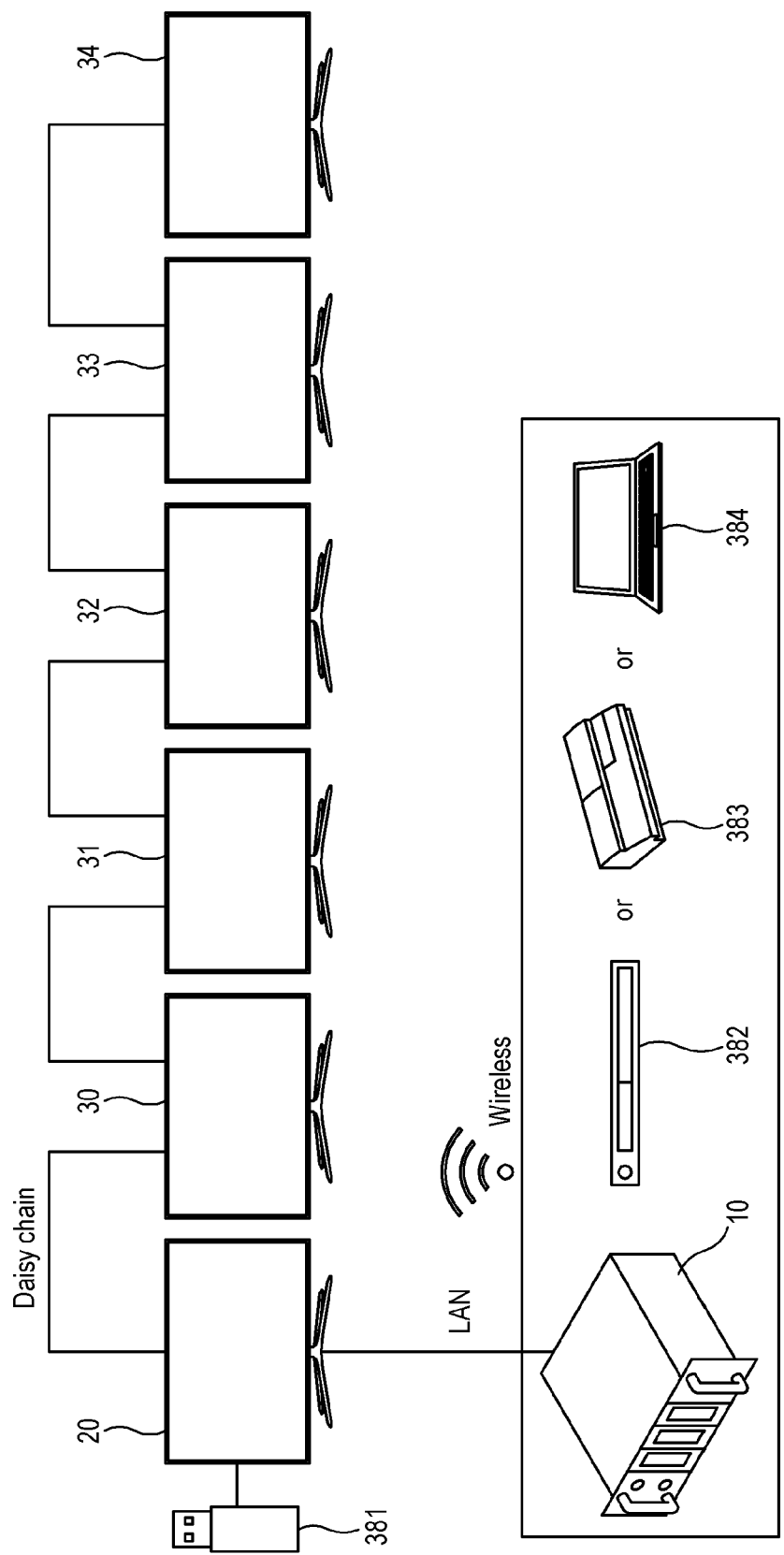
FIG. 6 illustrates a configuration between a server and a plurality of display apparatuses, according to an embodiment.

FIG. 6 illustrates a configuration between a server and a plurality of display apparatuses, according to an embodiment. As shown in FIG. 6, the server 10 connects with one display apparatus 20 from among the plurality of display apparatuses 20, 30, 31, 32, 33 and 34. In this case, the plurality of display apparatuses 20, 30, 31, 32, 33 and 34 are connected in series. For example, the display apparatus 20 connected to the server 10 in a daisy chain scheme bypasses a signal to other display apparatuses 30, 31, 32, 33 and 34.

The server 10 communicates with the display apparatus 20 via a LAN or a wireless communication method, and content and information of the 360-degree image 950 are transmitted and received between them.

According to an embodiment, the server 10 may transmit data about a unit frame of the 360-degree image 950 having a resolution of 8K to the display apparatus 20. In this case, the server 10 may transmit data that corresponds to the entire region or a partial region of the 360-degree image 950 in accordance with network conditions.

The display apparatus 20 may determine the view angle of the screen 81 based on a total number of connected screens 81, 82, 83, . . . and a position at which the screen 81 from among the screens 81, 82, 83, . . . is arranged. Thus, the split image 91 may be produced by cropping an region that corresponds to the determined view angle of the screen 81 from the frame of the received 360-degree image 950.

Next, the display apparatus 20 transmits data about the frame of the 360-degree image 950 received from the server 10 to a connected first display apparatus 30.

The first display apparatus 30 may produce a split image 92, which is based on the total number of screens 81, 82, 83, . . . and the position at which the screen 82 among all the screens 81, 82, 83, . . . is arranged, from the data about the frame of the 360-degree image 950 received from the display apparatus 20.

Similarly, the first display apparatus 30 may transmit the data about the frame of the 360-degree image 950 to the second display apparatus 31, and cause the second display apparatus 32 to produce a split image 93 based on an arranged position of a screen 83 from among all the screens 81, 82, 83, . . . .

As described above, when the plurality of display apparatuses 20, 30, 31, 32, 33 and 34 are connected in series to the server 10, each of the display apparatuses 20, 30, 31, 32, 33 and 34 is configured to produce the split image in such a manner that one display apparatus 20 bypasses the data about the frame of the 360-degree image 950 received from the server 10 to another first display apparatus 30.

Figure 7:
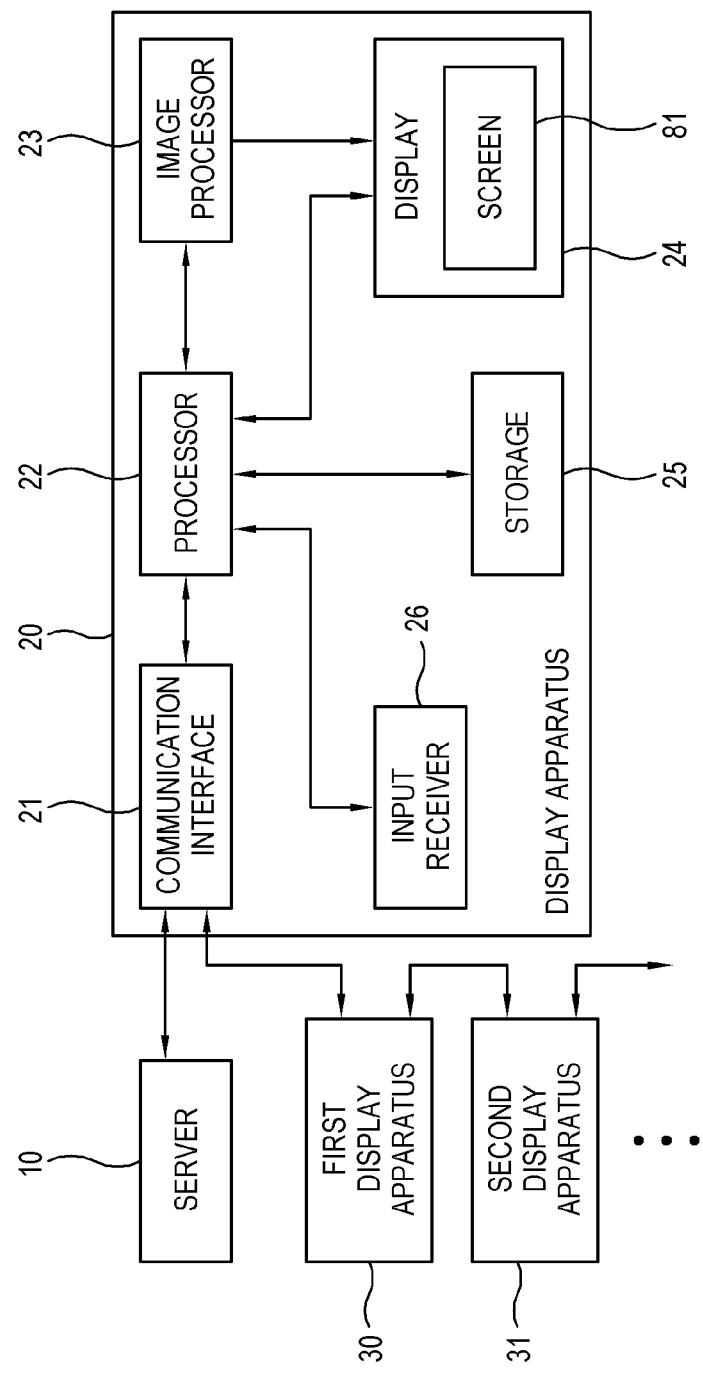
FIG. 7 is a block diagram of a display apparatus, according to an embodiment.

FIG. 7 is a block diagram of a display apparatus, according to an embodiment of the present disclosure. As shown in FIG. 7, the display apparatus 20 includes the communication interface 21, the processor 22, the image processor 23, the display 24, the storage 25 and the input receiver 26, and communicates with the server 10 and the first display apparatus 30 via the communication interface 21. The display apparatus 20 may, for example, include any of a TV, a smartphone, a projector, an HMD, etc. There are no limits to the elements of the display apparatus 20, and the display apparatus 20 may further include another element. In this aspect, the elements of the display apparatus 20 are the same as those of FIG. 3, and thus only different features will be described in order to avoid repetitive descriptions.

In the illustrated configuration, the display apparatus 20 and the plurality of display apparatuses 30, 31 . . . are connected in series to the server 10, and may, for example, be connected in the daisy chain scheme.

In particular, the display apparatus 20 transmits a signal and data from the server 10 to the first display apparatus 30, and similarly the first display apparatus 30 transmits the signal and data to the second display apparatus 31.

According to an embodiment, the processor 22 receives data about the entire 360-image 950 or a partial region of the 360-degree image 950 from the server 10, and produces the split image 91 that corresponds to the screen 81 from the received data of the 360-degree image 950.

In this case, the processor 22 may determine the view angle of the split image 91 based on the number of screens corresponding to the plurality of display apparatuses 20, 30, 31, . . . and the arranged position of the screen 81 within the entire plurality of screens.

Further, the processor 22 transmits data of the 360-degree image 950 received from the server 10 as described above to the connected first display apparatus 30. Thus, the first display apparatus 30 is configured to produce the split image 92 based on the total number of screens and the arranged position of the screen 81 from the data of the 360-degree image 950 received from the display apparatus 20.

According to an embodiment, the processor 22 may transmit any of information about a user input received via the input receiver 26, information about a change in the view angle, and/or information about rotation control and zoom control, etc. to the first display apparatus 30. For example, the processor 22 transmits remote-controller control information received in the main screen 81 that is controlled by a user to the connected first display apparatus 30, so that the operations of the remote-controller control information can be mutually performed with respect to another screen 82.

Further, the processor 22 transmits any of information about a change in the view angle caused by a user input, information about rotation control in a pitching or yawing direction, and/or information about zoom-in or zoom-out control to the first display apparatus 30, so that an operation corresponding to a user input can be organically connected to another screen 82.

Figure 8:
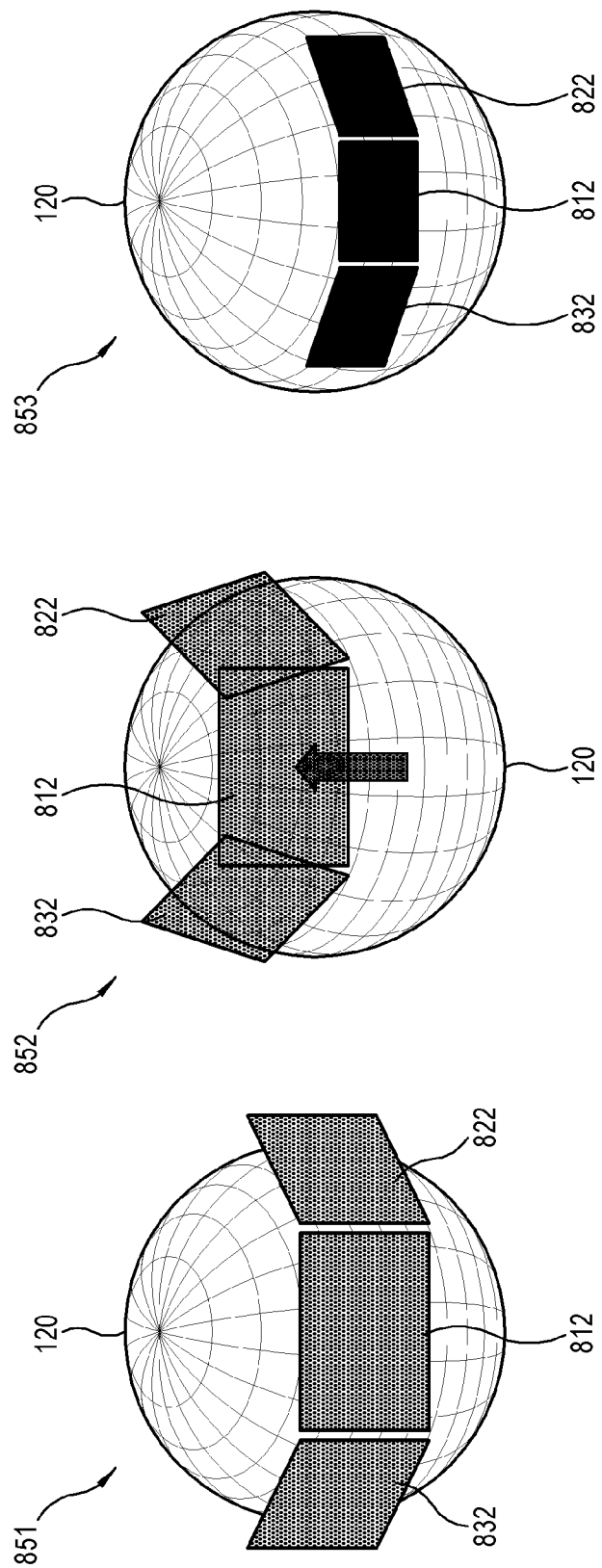
FIG. 8 illustrates an example of displaying a projection image in response to user control.

FIG. 8 illustrates an example of displaying a projection image in response to user control in the related art. As shown in FIG. 8, when projection images 812, 822 and 832 respectively corresponding to multi-screens 81, 82 and 83 are displayed around an equator of the sphere 120 (as illustrated in item 851), the projection images 812, 822 and 832 may be moved in upward and downward directions or zoom-controlled in response to a user's input.

In the illustrated example, when the projection images 812, 822 and 832 are moved up and/or down in response to a user's input (as illustrated in item 852), the viewpoint moves in accordance with longitude and latitude, thereby causing an overlapping region between the projection images 812, 822 and 832 displayed on the screens.

Further, when the projection images 812, 822 and 832 are zoom-controlled in response to a user's input (as illustrated in item 853), the view angles are uniformly adjusted with regard to all the screens 81, 82 and 83 and it is therefore impossible to maintain the same range of the view angle, since total view angles are decreased or increased. Thus, there may be an overlapping region or a discontinuous gap region between the projection images 812, 822 and 832 at the zoom control.

Figure 9:
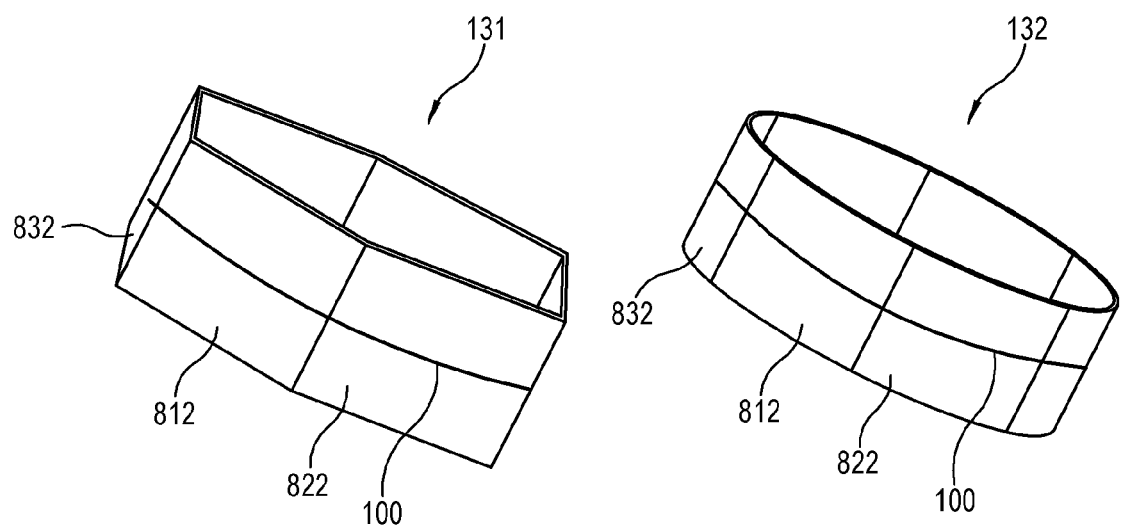
FIG. 9 illustrates an example of arranging projection images for screens on a great circle of a sphere, according to an embodiment.

FIG. 9 illustrates an example of arranging projection images for screens on a great circle of a sphere, according to an embodiment. As shown in FIG. 9, the display apparatus 20 produces projection images 812, 822, 832, . . . for the screens 81, 82, 83, . . . by mapping the split images 91, 92, 93, . . . of the 360-degree image 950 corresponding to the screens 81, 82, 83, . . . received from the server 10 onto the great circle 100 of the sphere 120.

In the illustrated example, when each of the multi-screens 81, 82, 83, . . . is a flat screen (as illustrated in item 131), the surfaces of the great circle 100 onto which the projection images 812, 822, 832, . . . are projected are flat.

Further, when each of the multi-screens 81, 82, 83, . . . is a curved screen (as illustrated in item 132), the surfaces of the great circle 100 onto which the projection images 812, 822, 832, . . . are projected are curved.

In this case, a projection method used for each screen may include any of rectilinear projection, stereographic projection, fisheye projection, etc. and is properly determined by taking any of various parameters such as an aspect ratio, curvature, etc. of each screen into account.

FIG. 10 illustrates a formula to calculate coordinates of a projection image for each screen arranged on a great circle of a sphere at rotation control, according to an embodiment. As shown in FIG. 10, as a result of performing pitching or yawing rotation control for the 360-degree image 950 reproduced on the multi-screens 81, 82, 83, . . . , the coordinates 140 of the projection images 812, 822, 832, . . . on the respective screens 81, 82, 83, . . . are calculated by multiplying the coordinates of the sphere 120 by a projection matrix (P), a rotation matrix (R') 141 and an angular matrix (M) 142.

In this case, the projection matrix (P) is defined by a transformation function that corresponds to general projection, and the rotation matrix (R') 141 is defined by a function about change in the viewpoint of a control reference point 850.

Further, the angular matrix (M) 142 is defined by using angular distances ($\Delta\theta$, $\Delta\Phi$) of respective center points 811, 821, 831, . . . of the screens 81, 82, 83, . . . with respect to the control reference point 850.

Figure 11:
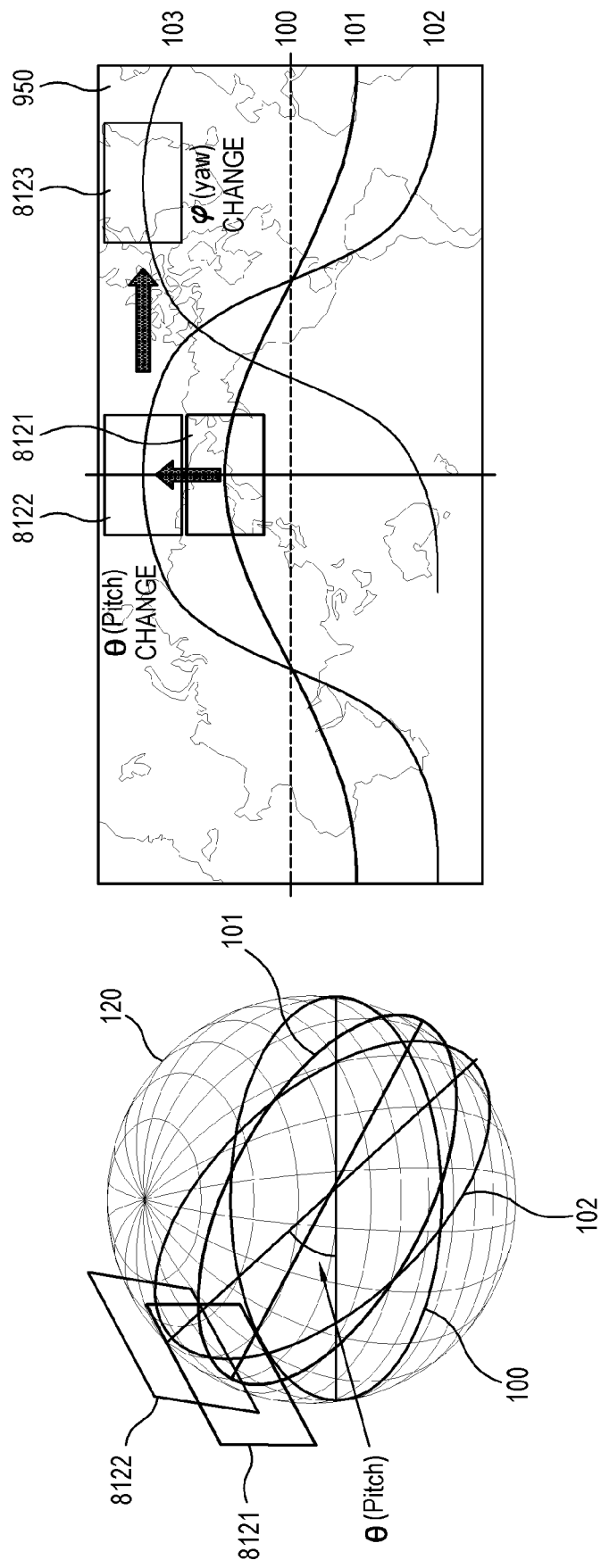
FIG. 11 illustrates an example of a shape of a great circle displayed on a sphere and a 360-degree image at rotation control, according to an embodiment.

FIG. 11 illustrates an example of a shape of a great circle displayed on a sphere and a 360-degree image at rotation control, according to an embodiment. As shown in FIG. 11, as a result of performing rotation control for the 360-degree image 950 reproduced on the multi-screens 81, 82, 83, . . . , the shapes of the great circles 100, 101, 102 displayed on the sphere 120 and the 360-degree image 950 are varied based on a pitching rotation angle ($\theta$) and a yawing rotation angle ($\Phi$).

In the illustrated example, at pitching rotation control, a projection image 8122 is displayed on a great circle 102 pitching as indicated by a rotation angle ($\theta$). Further, at yawing rotation control, a projection image 8123 is displayed on a great circle 103 yawing as indicated by a rotation angle ($\Phi$).

Figure 12:
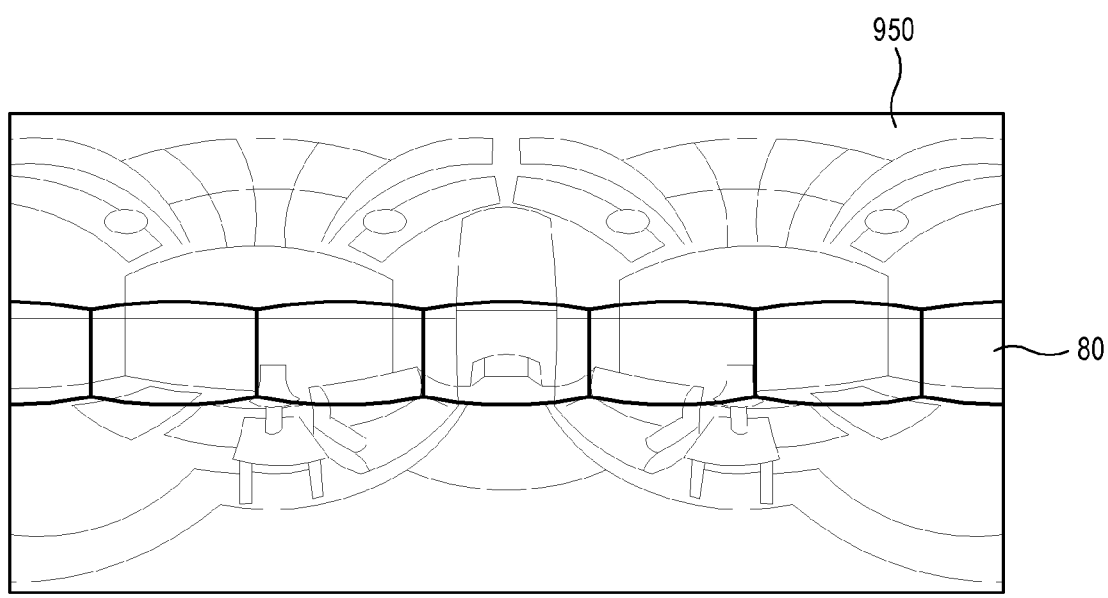
FIG. 12 illustrates an example of a projection region for each individual screen on a 360-degree image, according to an embodiment.

FIG. 12 illustrates an example of a projection region for each individual screen on a 360-degree image, according to an embodiment. As shown in FIG. 12, when the great circle 100 is aligned with the equator, a projection region 80 where the projection images 812, 822, 832, . . . of the multi-screens 81, 82, 83, . . . are displayed is displayed in the form of a straight line that is parallel to a equator line of the 360-degree image 950

Figure 13:
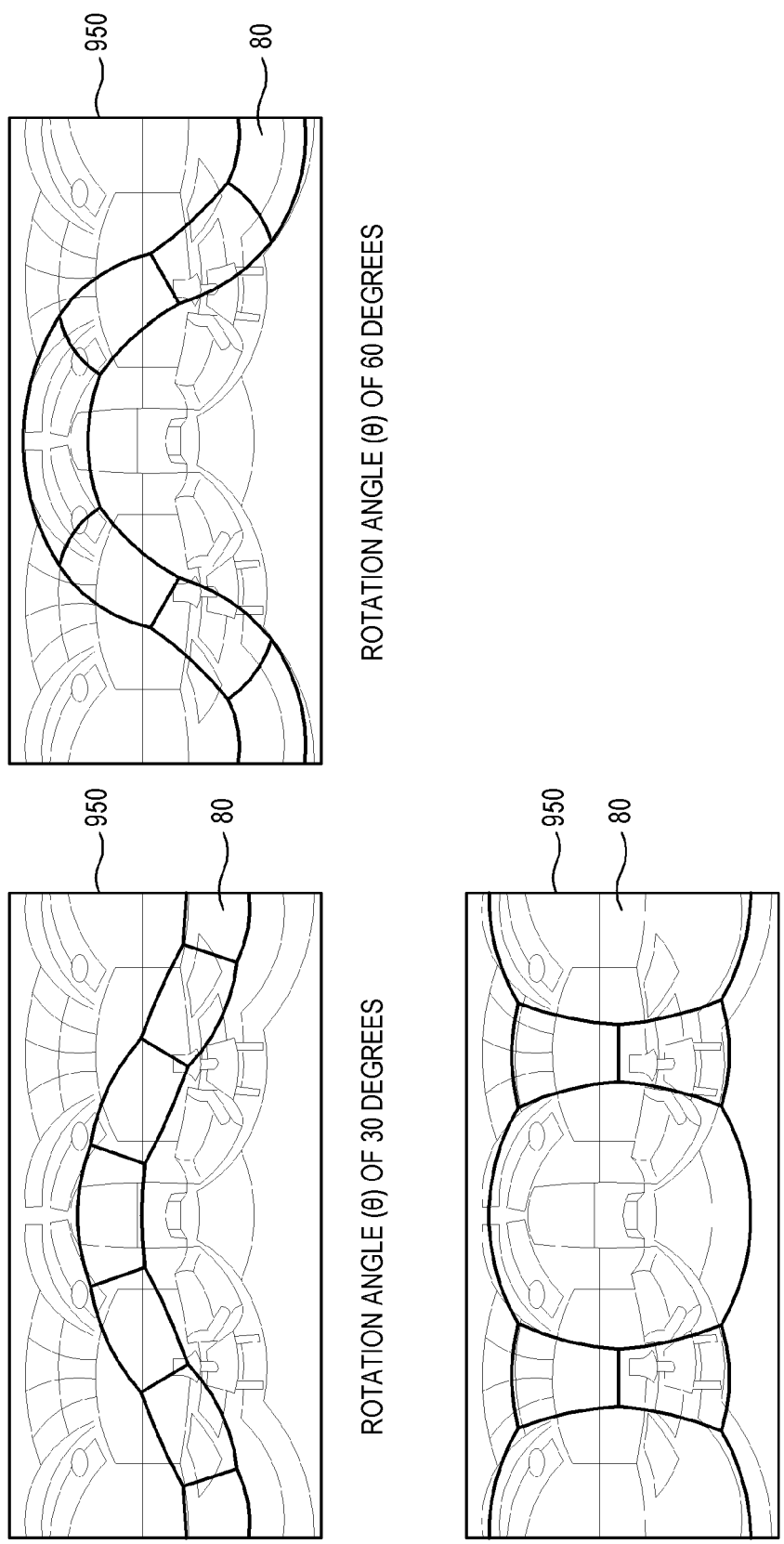
FIG. 13 illustrates an example of a projection region for each individual screen on a 360-degree image, according to an embodiment.

FIG. 13 illustrates an example of a projection region for each individual screen on a 360-degree image, according to an embodiment. As shown in FIG. 13, when the pitching rotation control is performed, the projection region 80 is displayed such that a middle portion thereof is moved upward based on the rotation angle ($\theta$) from the equator line of the 360-degree image 950.

In this case, the shape of the projection region 80 is varied based on the sizes of the rotation angle ($\theta$) (e.g. 30 degrees, 60 degrees and 90 degrees).

Thus, when the pitching rotation operation is performed, the rotation angle of the great circle 100 is taken into account to seamlessly display images on the screens without an overlapping region or a lost region.

Figure 14:
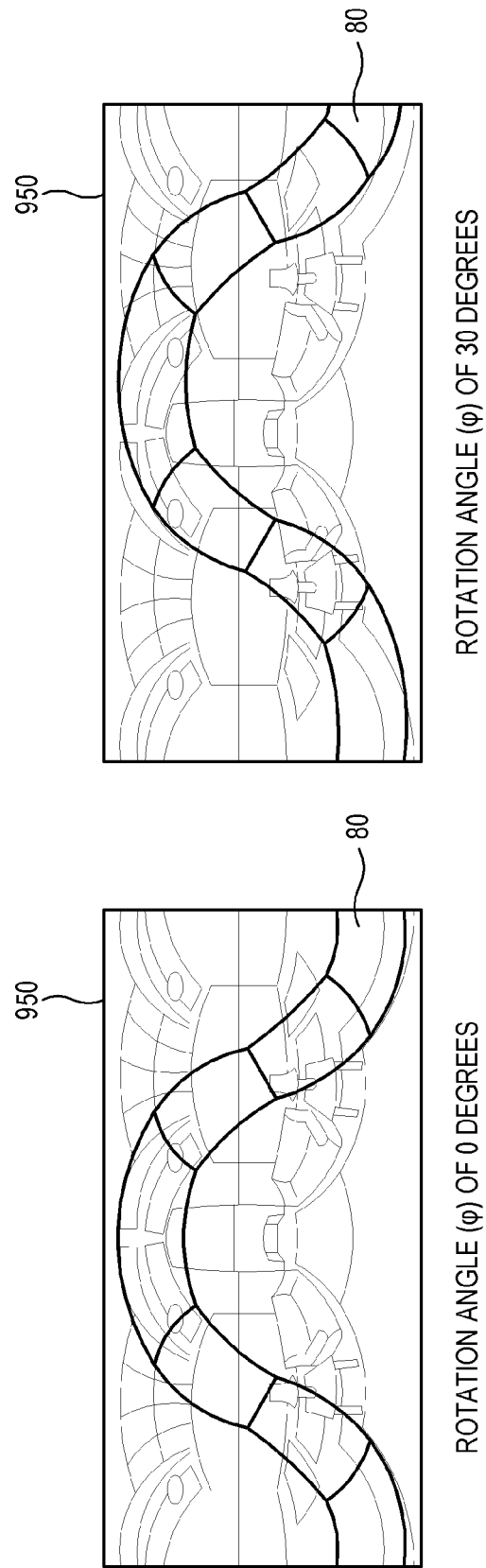
FIG. 14 illustrates an example of a projection region for each individual screen on a 360-degree image, according to an embodiment.

FIG. 14 illustrates an example of a projection region for each individual screen on a 360-degree image, according to an embodiment. As shown in FIG. 14, when a yawing rotation control is performed, the projection region 80 is displayed as having moved rightward based on the rotation angle (Φ) from the center of the 360-degree image 950.

In this case, the shape of the projection region 80 is varied based on the sizes of the rotation angle (Φ) (e.g. 0 degrees, 30 degrees).

Thus, when the yawing rotation operation is performed, the rotation angle and direction of the great circle 100 are taken into account to seamlessly display images on the screens without an overlapping region or a lost region.

Figure 15:
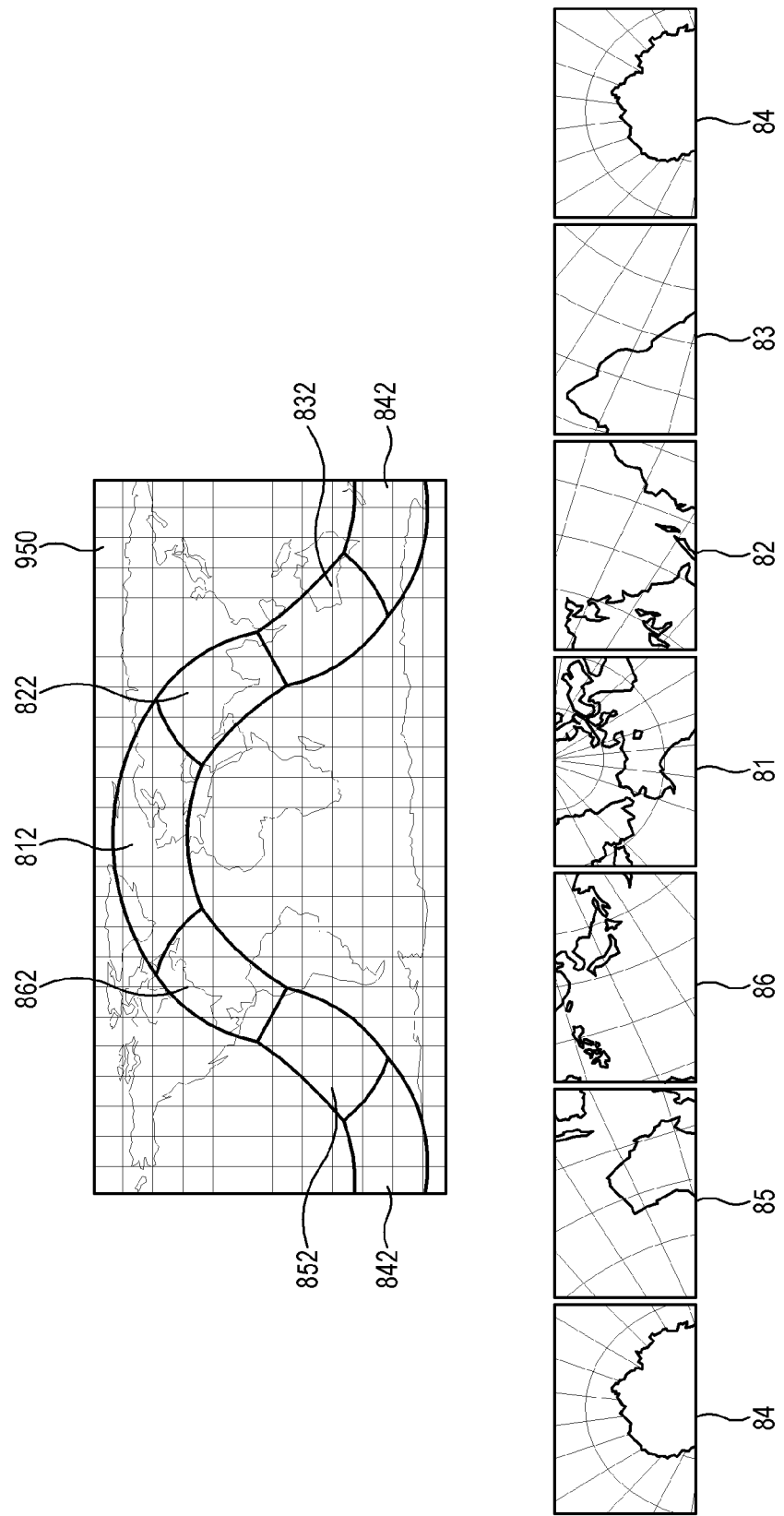
FIG. 15 illustrates an example of a projection image displayed on each individual screen at rotation control, according to an embodiment.

FIG. 15 illustrates an example of a projection image displayed on each individual screen at rotation control, according to an embodiment. As shown in FIG. 15, as a result of the pitching rotation control, projection images 812, 822, 832, 842, 852 and 862 are displayed corresponding to the screens 81, 82, 83, 84, 85 and 86 on the great circle 100 of the 360-degree image 950.

By the foregoing methods, the projection images 812, 822, 832, 842, 852 and 862 respectively displayed on the screens 81, 82, 83, 84, 85 and 86 are seamlessly displayed without an overlapped or lost region between them.

Figure 16:
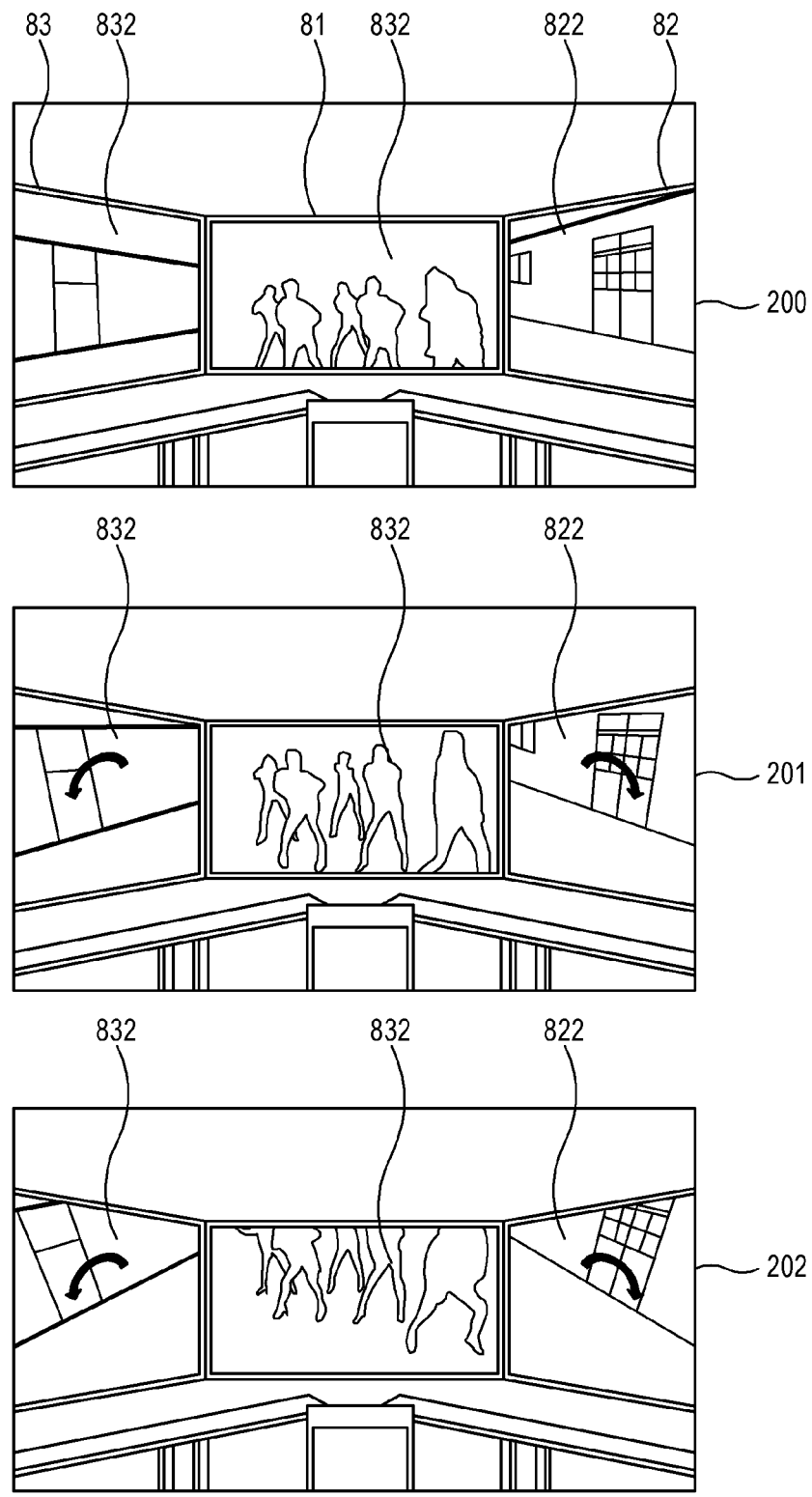
FIG. 16 illustrates an example of change in a projection image displayed on each individual screen at rotation control, according to an embodiment.

FIG. 16 illustrates an example of change in a projection image displayed on each individual screen at rotation control, according to an embodiment. As shown in FIG. 16, when the 360-degree image 950 is subjected to the pitching rotation control, projection images 822 and 832 displayed on left and right end screens 82 and 83 are rotated in a rolling direction with respect to the main screen 81 which includes the control reference point 850.

In the illustrated example, in the state 200 that a user watches the 360-degree image 950 while looking at the main screen 81 from the front, when pitching rotation control is performed as much as a rotation angle of 30 degrees (as illustrated in item 201), the projection images 822 and 832 are displayed as rotated in a rolling direction as much as the angle of about 30 degrees.

In this case, when a user further performs the pitching rotation control as much as an angle of about 45 degrees (as illustrated in item 202), the projection images 822 and 832 are displayed as rotated in a rolling direction as much as the angle of about 45 degrees.

As described above, according to an embodiment, the projection images respectively displayed on the screens are seamlessly displayed without an overlapping or lost region even when the 360-degree image 950 is subjected to the rotation control.

Figure 17:
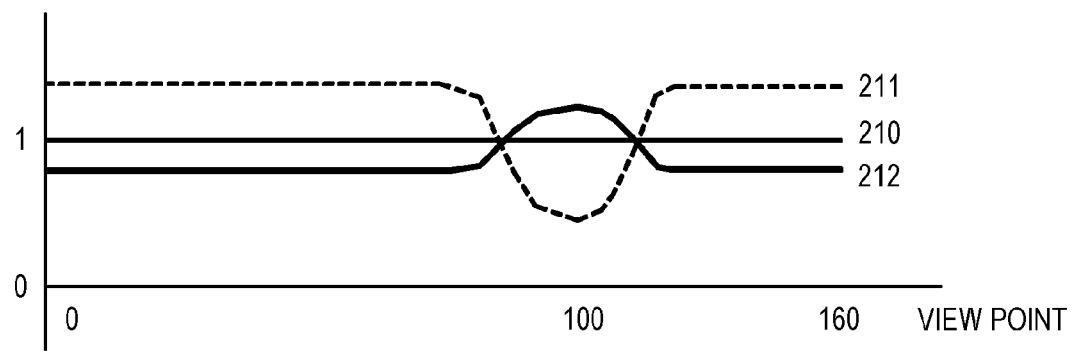
FIG. 17 is a graph of showing view-angle setting values in accordance with viewpoints of each individual screen at zoom control, according to an embodiment.

FIG. 17 is a graph of showing view-angle setting values in accordance with viewpoints of each individual screen at zoom control, according to an embodiment. As shown in FIG. 17, when the 360-degree image 950 is controlled to be zoomed in or zoomed out, setting values for the view angle may be derived in accordance with the angular distances (see Δθ and ΔΦ of FIG. 29) from the control reference point 850.

The setting values for the view angle are required to have successive values according to the pitching and yawing rotation angles (see θ and Φ of FIG. 11). Thus, the projection images displayed on the screens are seamlessly connected.

Further, values obtained by integrating the setting values for the view angle are required to be within a total range of view angle. In particular, when the view angle of one screen is decreased by zoom-in control, the view angles of the other screens are increased within the total range of the view angle.

In the illustrated example, when the horizontal view angles for the multi-screens have a total range of 160 degrees and the control reference point 850 has an angle of 100 degrees, the graph of the setting values for the view angle is varied based on zoom-in control 211 and zoom-out control 212.

First, in a case 210 of the setting values for the view angle before the zoom control, each screen has a uniform view angle throughout the total range of the view angles. In a case 211 of the setting values for the view angle resulting from the zoom-in control, the view angle of the screen corresponding to the angle of 100 degrees at the control reference point 850 is decreased, but the view angles of the other screens are increased within the total range of the view angle.

Further, in a case 212 of the setting values for the view angle resulting from the zoom-out control, the view angle of the screen corresponding to the angle of 100 degrees at the control reference point 850 is increased, but the view angles of the other screens are decreased within the total range of the view angle.

According to an embodiment, the total range of the view angle displayed on the multi-screens may be determined by using at least one from among the following methods.

First, when the multi-screens are arranged in a circular form, the total range of the view angle is maintained to a maximum of 360 degrees.

Second, the total range of the view angle may range from a to b degrees.

Third, the view angle may be greater than c degrees so that a major object can be always displayed on the screen within the 360-degree image 950. In this case, the major object may be selected in response to a user input or determined based on an analysis of the 360-degree image 950.

According to an embodiment, the control reference point 850 may be changed for the zoom control. For example, a reference point may be generated at a position that is different from the control reference point 850 without returning to an original view angle after zooming in or out from the control reference point 850.

Alternatively, operations may be made with respect to another reference point at a different position from the control reference point 850 after returning to the original view angle from the zoom-in or zoom-out operation.

Alternatively, operations may be made with respect to a new reference point while maintaining the view angle changed by the zoom-in or zoom-out operation.

Figure 18:
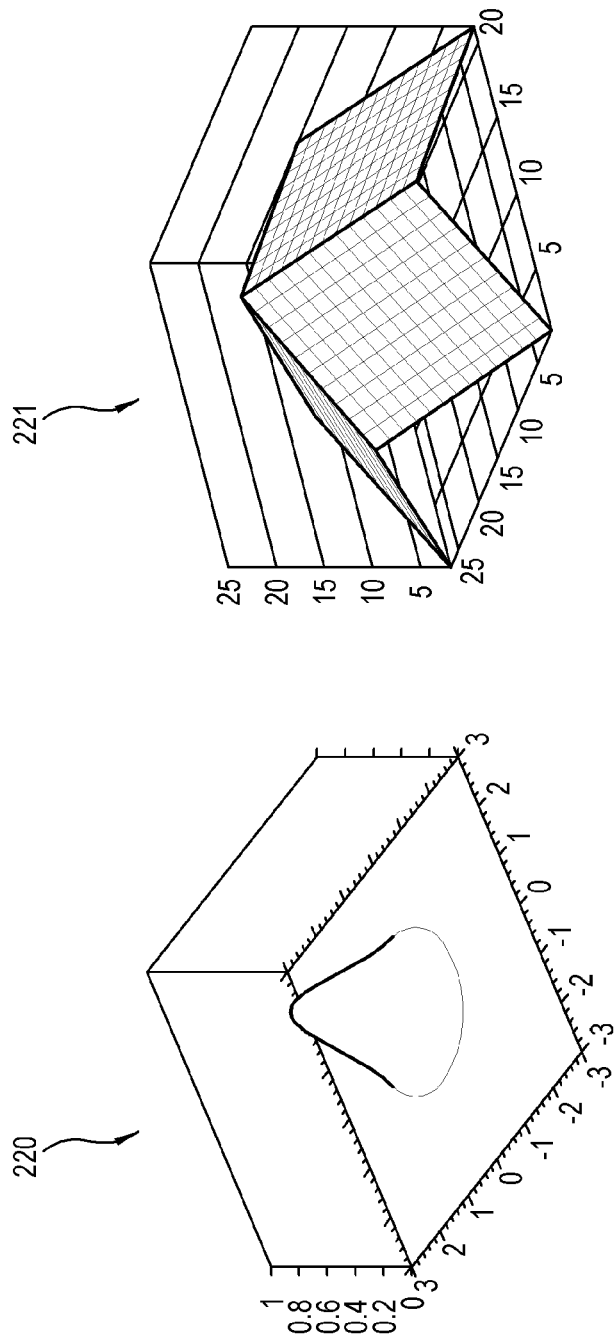
FIG. 18 is a graph of a function of view-angle setting values, according to an embodiment.

FIG. 18 is a graph of a function of view-angle setting values, according to an embodiment. As shown in FIG. 18, a function of the setting values for the view angle with respect to the control reference point 850 may be variously represented in any of a Gaussian graph 220, a pyramid graph 221, etc.

For example, in a case of the Gaussian graph 220, the area of the region where the setting values for the view angle are continuously changed with respect to the control reference point 850 in accordance with variance, the difference in the setting value for the view angle between the viewpoint of the control reference point 850 and the farthest viewpoint, etc. may be determined.

In this case, the function of the setting values for the view angle may be predetermined, or may be optimized in accordance with a usage log of a user.

Figure 19:
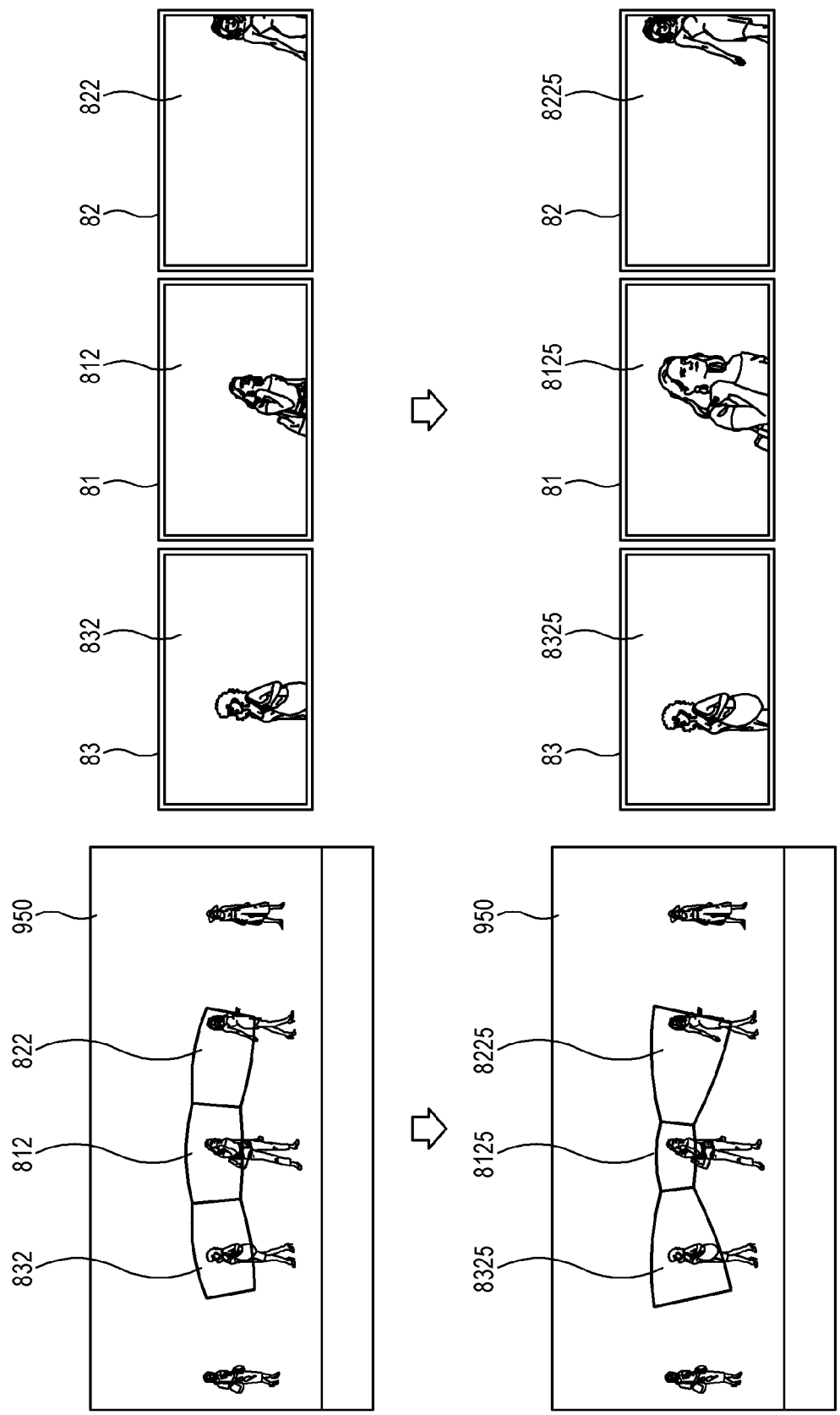
FIG. 19 illustrates an example of change in a view angle with regard to each screen at zoom control, according to an embodiment.

FIG. 19 illustrates an example of change in a view angle with regard to each screen at zoom control, according to an embodiment. As shown in FIG. 19, in a state that the projection images 812, 822 and 832 having a uniform view angle are displayed on the screens 81, 82 and 83 while reproducing the 360-degree image 950, the middle screen 81 may include the control reference point 850 and be subjected to the zoom-in control.

In the illustrated example, a projection image 8125 having a narrower view angle than that before the zoom-in control is displayed on the middle screen 81 in response to the zoom-in control. In this case, the other screens 82 and 83 respectively display projection images 8225 and 8325, which have a wider view angle than those before the zoom-in control, so as to maintain the total range of the view angle of all the screens 81, 82 and 88.

Further, by the zoom-in control, an object displayed on the middle screen 81 is enlarged, and objects displayed on the other screens 82 and 83 are reduced.

As described above, the total range of the view angle for all the screens 81, 82 and 83 are maintained during the zoom control, and therefore the 360-degree image 950 is displayed without losing a major object on each screen.

Figure 23:
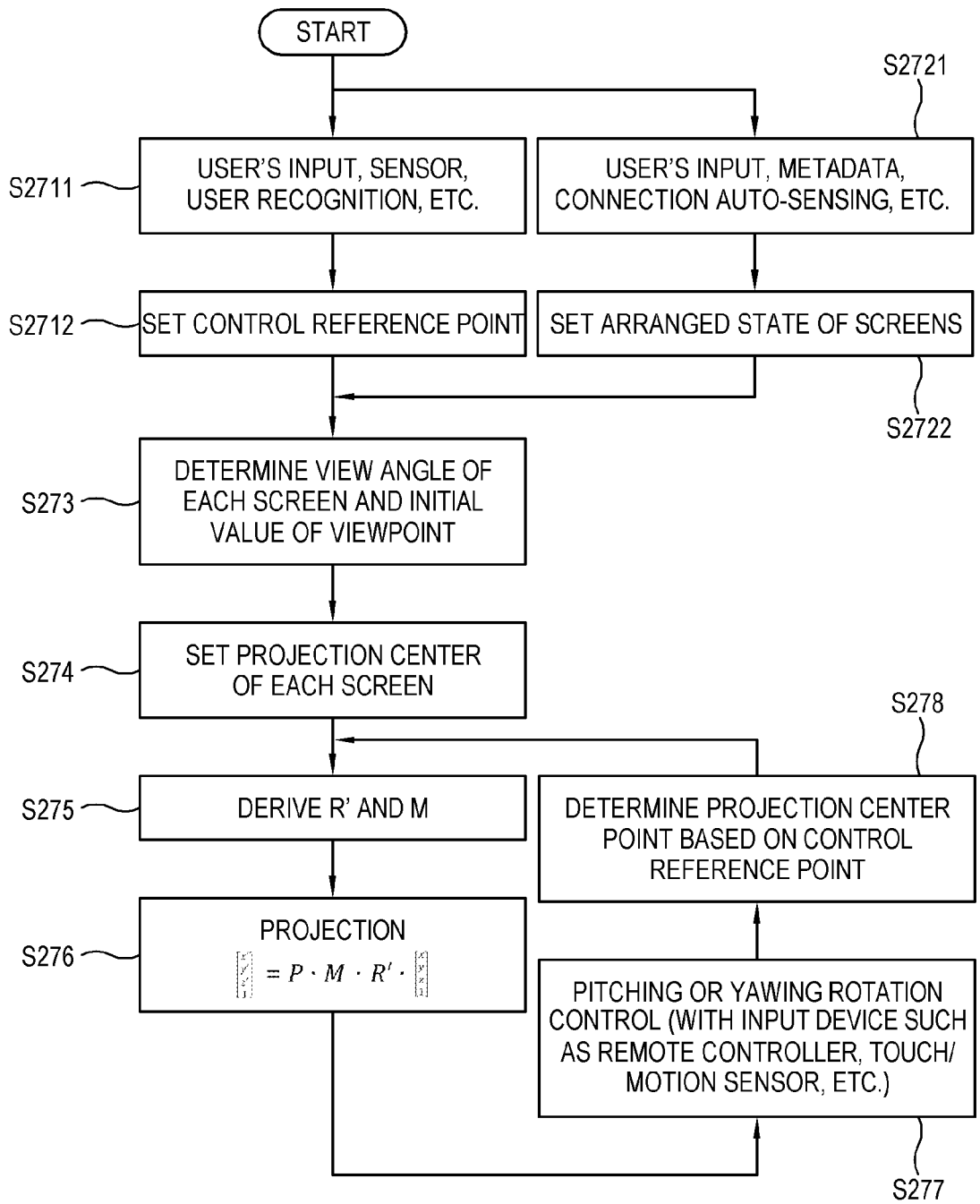
FIG. 23 is a flowchart of showing operations of a display apparatus at rotation control, according to an embodiment.

FIG. 23 is a flowchart showing operations of a display apparatus at rotation control, according to an embodiment. As shown in FIG. 23, a user's input, a sensor's sensing, a user recognition, etc. are performed at operation S2711, and the control reference point 850 for controlling the 360-degree image 950 is set at operation S2712. Further, a user's input, metadata referring, connection auto-sensing, etc. are performed at operation S2721, and an arranged state of screens is set at operation S2722.

Thus, when the control reference point and the arranged state of the screen are completely set, the view angle of each screen and the initial value of the viewpoint are determined at operation S273, and the respective projection center corresponding to the viewpoint on each screen is set at operation S274.

Next, at operation S275, a rotation matrix (R') 141 and an angular matrix (M) 142 are derived for calculating the coordinates of the respective projection image displayed on each screen. In this aspect, the rotation matrix (R') 141 is defined by a function about the change of the viewpoint at the control reference point 850. Further, the angular matrix (M) 142 is defined by using the angular distances ($\Delta\theta$, $\Delta\Phi$) at the center point of each screen from the control reference point 850.

At operation S276, the rotation matrix (R') 141 and the angular matrix (M) 142 are used to calculate the coordinates of the respective projection image projected onto each corresponding screen, thereby displaying the projection image on each screen.

Next, when the pitching or yawing rotation control is performed with regard to the projection image by an input device such as a remote controller, a touch pad, a motion sensor, etc. at operation S277, the viewpoint of the control reference point 850 is changed at operation S278.

Then, the operation S275 and the operation S276 are performed again to display the projection image changed by the rotation control, and the following operations are repeated.

According to the foregoing embodiment, the rotation angle and direction of the great circle are taken into account at the pitching rotation control and/or the yawing rotation control, so that the images displayed on the screens are seamlessly displayed without an overlapping or lost region.

Figure 24:
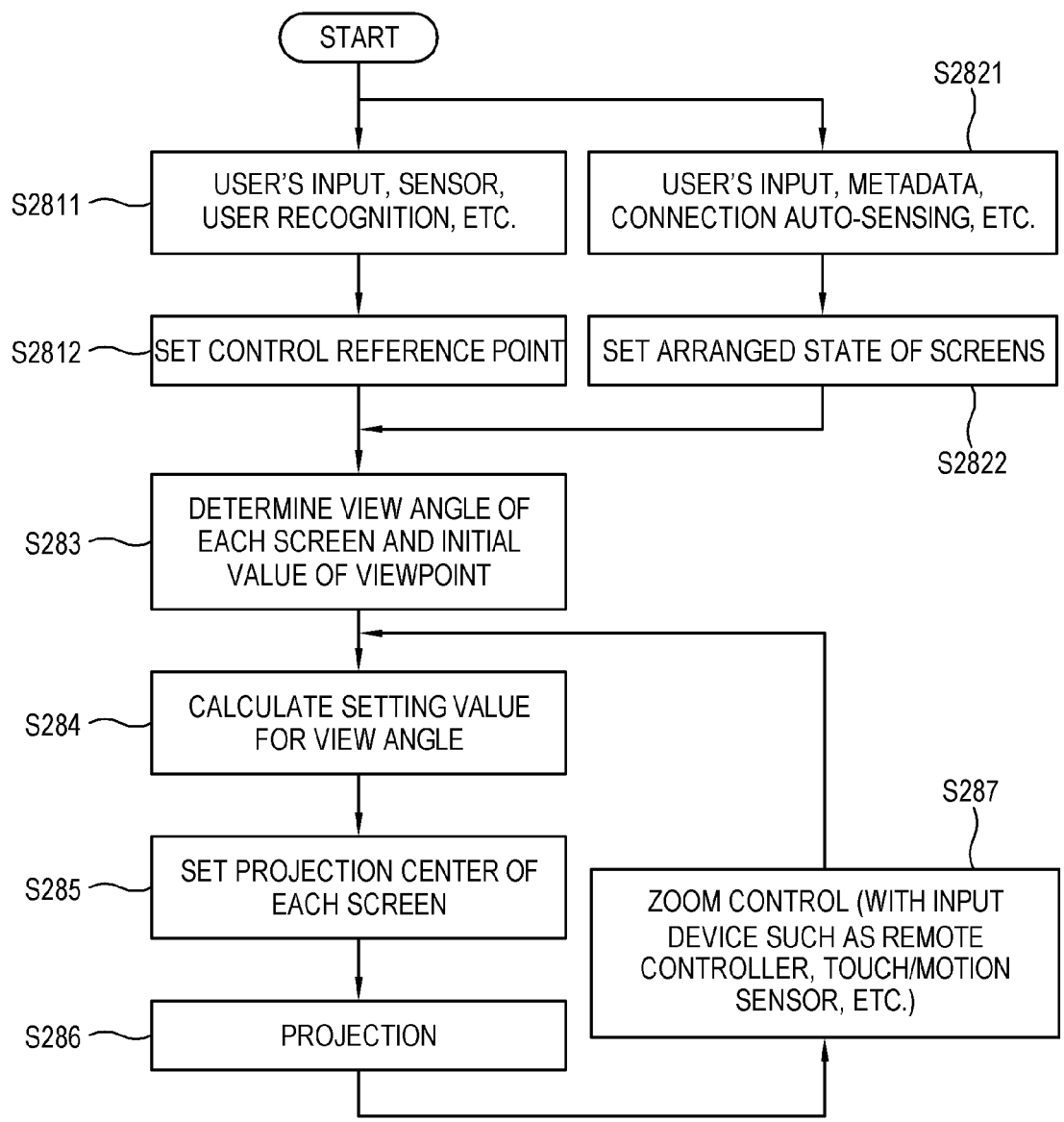
FIG. 24 is a flowchart of showing operations of a display apparatus at zoom control, according to an embodiment.

FIG. 24 is a flowchart showing operations of a display apparatus at zoom control, according to an embodiment. As shown in FIG. 24, a user's input, a sensor's sensing, a user recognition, etc. are performed at operation S2811, and the control reference point 850 for controlling the 360-degree image 950 is set at operation S2812. Further, a user's input, metadata referring, connection auto-sensing, etc. are performed at operation S2821, and an arranged state of screens is set at operation S2822.

Thus, when the control reference point and the arranged state of the screen are completely set, the view angle of each screen and the initial value of the viewpoint are determined at operation S283, and the setting values for the view angles according to the screens are calculated at operation S284. In this case, the setting values for the view angles are derived based on the angular distances ($\Delta\theta$, $\Delta\Phi$) from the control reference point 850, and have continuous values in accordance with the pitching and yawing rotation angles ($\theta$, $\Phi$).

In this case, the respective setting values for the view angles according to the screens are set to maintain the total range of the view angle, and therefore a major object in the projection image displayed on each screen is not lost.

Next, the respective projection center corresponding to the viewpoint of each screen is set at operation S285, and the respective projection image is displayed on each corresponding screen at operation S286.

Next, at operation S287, when zoom control for the projection image is performed via any of a remote controller, a touch pad, a motion sensor and the like input device, the setting values for the view angles according to the screens are calculated again at operation S284.

Then, the operation S285 and the operation S286 are performed again to display the projection image changed by the zoom control, and the following operations are repeated.

According to the foregoing embodiment, the total range of the view angle is maintained during the zoom-in or zoom-out control, so that an image in the screen can be displayed without losing a major object.

Figure 25:
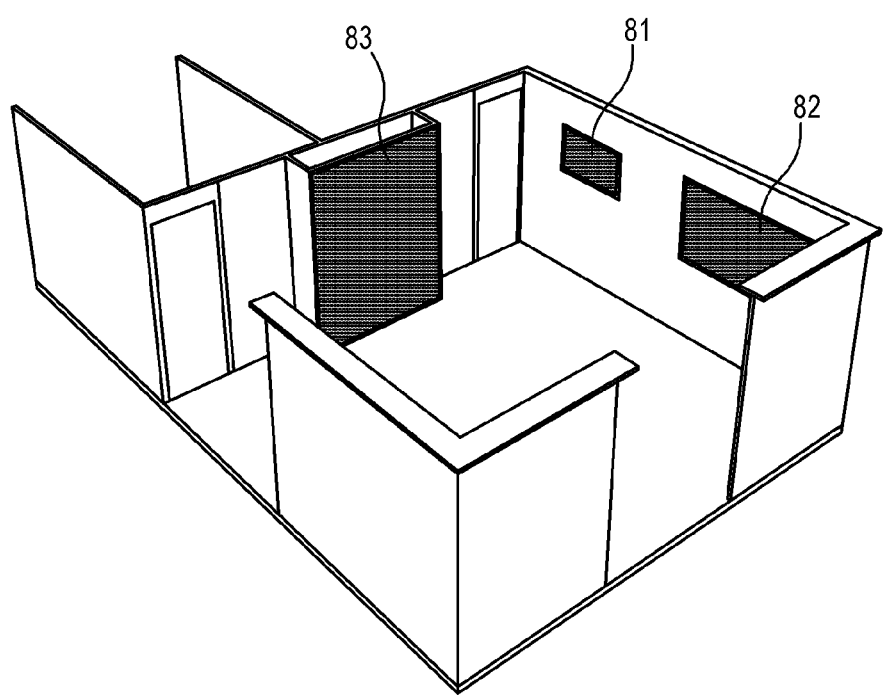
FIG. 25 illustrates an example of selecting multi-screens within a space, according to an embodiment.

FIG. 25 illustrates an example of selecting multi-screens within a space, according to an embodiment. As shown in FIG. 25, according to an embodiment, the 360-degree image may be reproduced and controlled based on the multi-screens selected by a user via a UI that includes images corresponding to apparatuses arranged in a surrounding space.

According to an embodiment, a user may select a plurality of screens, placed at various positions in a home, via the UI, thereby configuring the multi-screens 81, 82 and 83. In this case, each of the multi-screens 81, 82 and 83 may include a physical and independent screen, and a virtual screen created by an HMD or the like. Further, when a projector projects an image to an object, the object may be regarded as one of the multi-screens. In addition, flat and curved screens are all possible for the multi-screens 81, 82 and 83.

The multi-screens 81, 82 and 83 may be connected in up, down, left and right directions. Alternatively, the screens may be arranged so as to leave a space therebetween. Further, there are no limits to the arranged shape of the multi-screens 81, 82 and 83. For example, the multi-screens may be arranged having a cylindrical or dome shape so as to surround a user.

According to the foregoing embodiment, a user may directly select the multi-screens for reproducing the 360-degree image from among peripheral apparatuses, and watch the 360-degree image through a desired apparatus.

Figure 26:
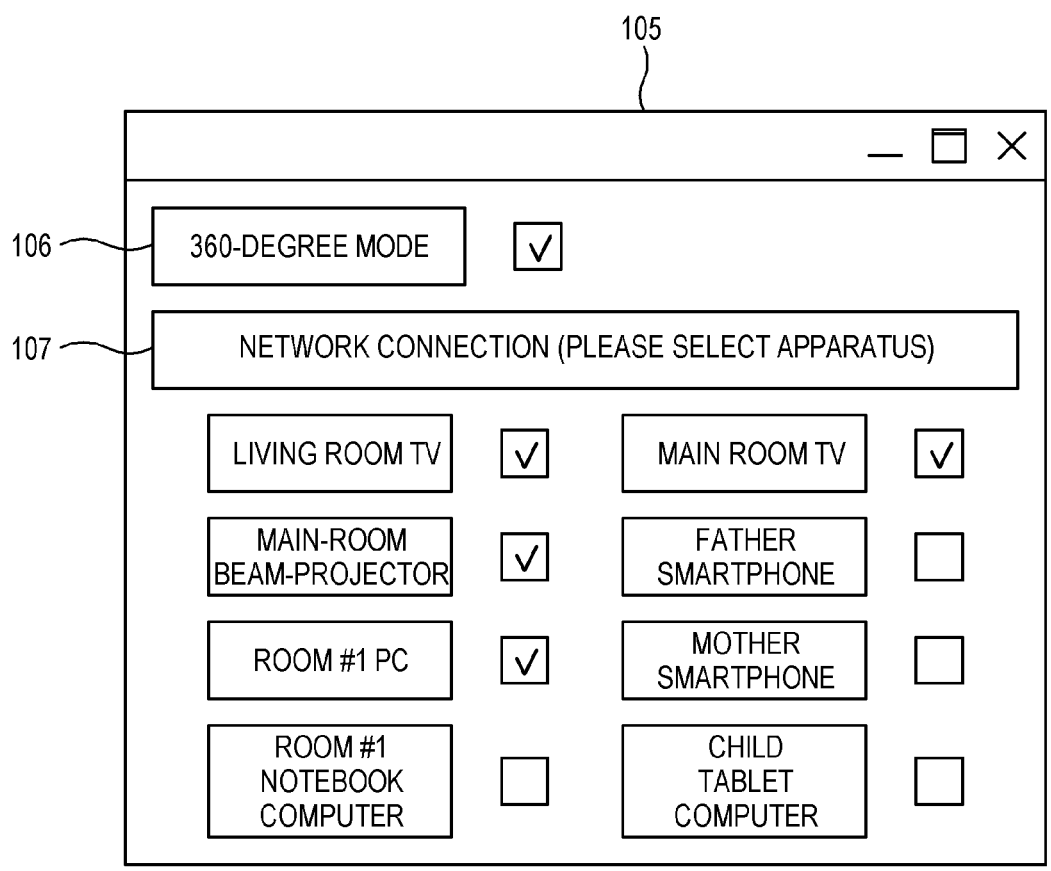
FIG. 26 illustrates an example of a user interface (UI) for selecting multi-screens to display a 360-degree image, according to an embodiment.

FIG. 26 illustrates an example of a user interface (UI) for selecting multi-screens to display a 360-degree image, according to an embodiment. As shown in FIG. 26, the display apparatus 20 according to the embodiment may display a screen setting UI 105 for selecting a plurality of screens from among the screens placed within a space to reproduce the 360-degree image 950.

According to an embodiment, a user may select a menu for setting a plurality of screens from among a plurality of menus provided by the display apparatus 20. In this case, the screen setting UI 105 is displayed on a screen in response to a user's menu selection, and the screen setting UI 105 shows a 360-degree mode setting menu 106 and an apparatus selecting menu 107.

A user may select the 360-degree mode setting menu 106, and select a plurality of apparatuses connected via a network on the apparatus selecting menu 107.

In the illustrated example, a user selects a 'living room TV', a 'main room TV', a 'main-room beam-projector', and a 'room #1 PC' from among the connectable apparatuses via the apparatus selecting menu 107.

Thus, a user can more easily select the multi-screens for reproducing the 360-degree image via the UI displayed on the screen.

Figure 27:
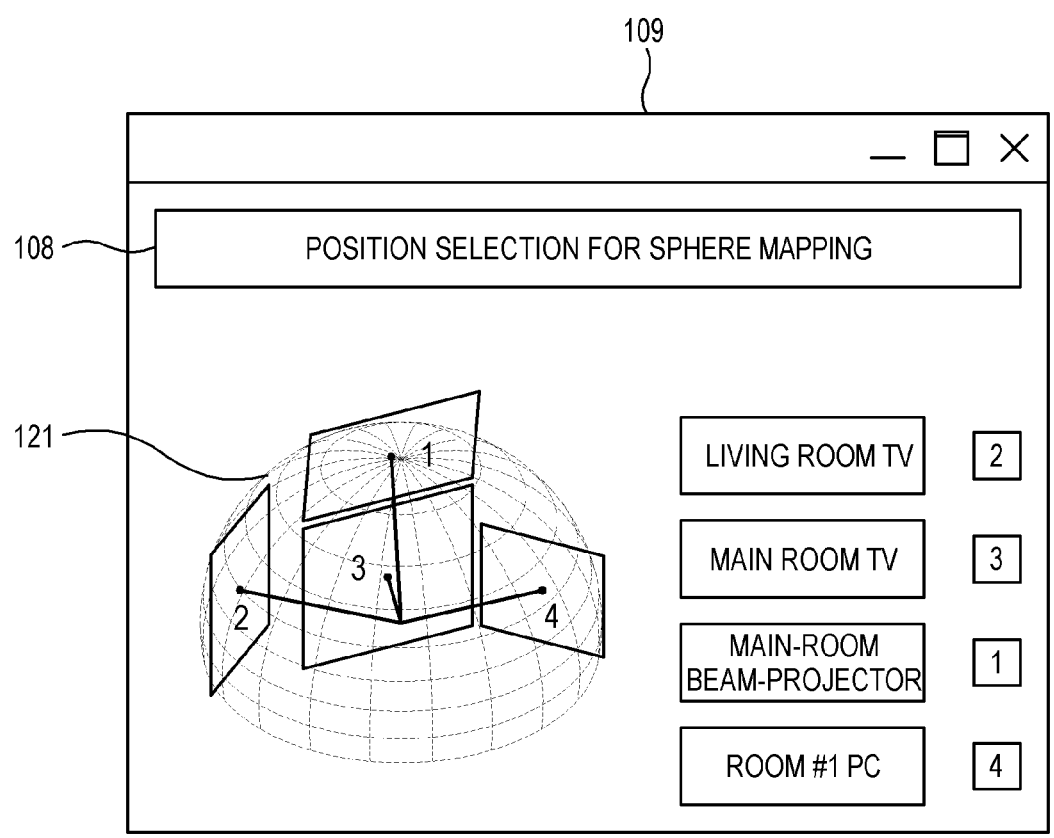
FIG. 27 illustrates an example of a UI for mapping selected multi-screens to a sphere, according to an embodiment.

FIG. 27 illustrates an example of a UI for mapping selected multi-screens to a sphere, according to an embodiment. As shown in FIG. 27, the display apparatus 20 may display a sphere mapping UI 109 for setting a position of a sphere 121, to which a respective split image corresponding to each screen is mapped, with regard to the multi-screens selected via the screen setting UI (see item '105' of FIG. 26). In this case, a user can easily set the position of the sphere 121, to which the split image corresponding to each screen is mapped, via the UI by a visual method.

In the illustrated example, the sphere mapping UI 109 shows a position selecting menu 108 for sphere mapping, so that the 'living room TV', the 'main room TV', the 'main-room beam-projector' and the 'room #1 PC' previously selected via the screen setting UI 105 can be mapped to the desired regions of the sphere 121. For example, the 'living room TV', the 'main room TV', the 'main-room beam-projector' and the 'room #1 PC' may be respectively mapped to a region #2, a region #3, a region #1 and a region #4 as illustrated.

In this case, a user may directly input a desired mapping-region number of the sphere 121, and may drag and map an corresponding apparatus icon to a desired position on the sphere 120.

Alternatively, the display apparatus 20 may automatically recognize the positions of the multi-screens selected on the screen setting UI 105 by an image sensor or the like of a camera, and map each screen to the region of the sphere 121 in accordance with the recognized positions.

Figure 28:
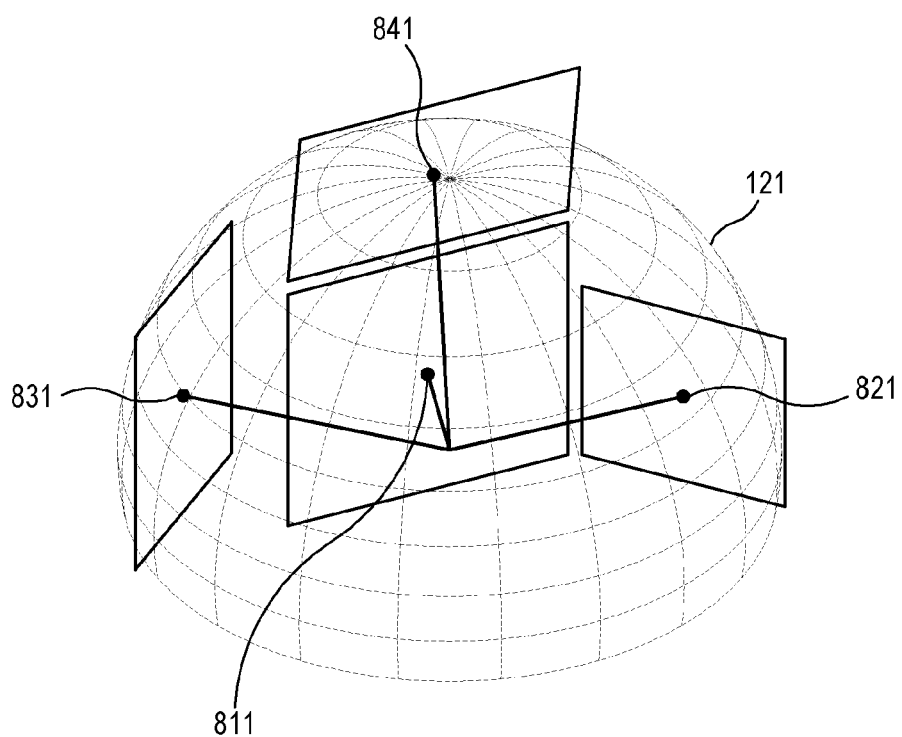
FIG. 28 illustrates an example of configuring a virtual sphere by connecting center points of screens, according to an embodiment.

FIG. 28 illustrates an example of configuring a virtual sphere by connecting center points of screens, according to an embodiment. As shown in FIG. 28, the display apparatus 20 according to the present embodiment may configure a virtual sphere 121 through center points 811, 821, 831 and 841 of the respective screens so as to reproduce and control the 360-degree image in the multi-screens 81, 82, 83 and 84.

In the illustrated example, the virtual sphere 121 may be configured by connecting the center points 811, 821, 831 and 841 of the respective screens. Alternatively, when the center points 811, 821, 831 and 841 of the respective screens are not suitable for configuring one sphere, the sphere 121 may be configured to have the minimum sum of distances between the center of the virtual sphere 121 and the center points.

Figure 29:
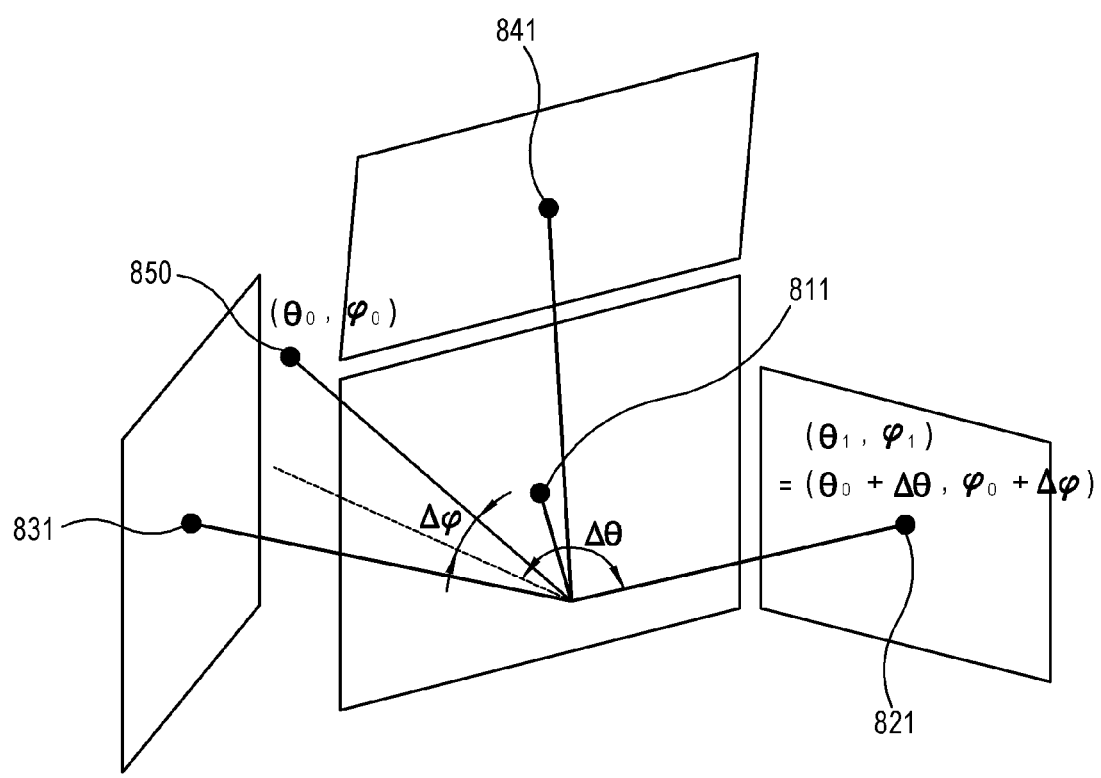
FIG. 29 illustrates an example of determining a projection center of screens by configuring a virtual sphere, according to an embodiment.

FIG. 29 illustrates an example of determining a respective projection center of each of a plurality of screens by configuring a virtual sphere, according to an embodiment. As shown in FIG. 29, the display apparatus 20 according to the present embodiment may calculate the viewpoint of each screen, i.e. the center point of the respective projection image displayed on each of the multi-screens 81, 82, 83 and 84, from the virtual sphere (see '121' in FIG. 28) configured by connecting the center points 811, 821, 831 and 841 of the multi-screens 81, 82, 83 and 84 selected by a user's input.

To this end, a method of setting the control reference point 850 of the multi-screens 81, 82, 83 and 84 and determining the projection center will be described below with reference to FIGS. 20, 21, and 22.

Figure 20:
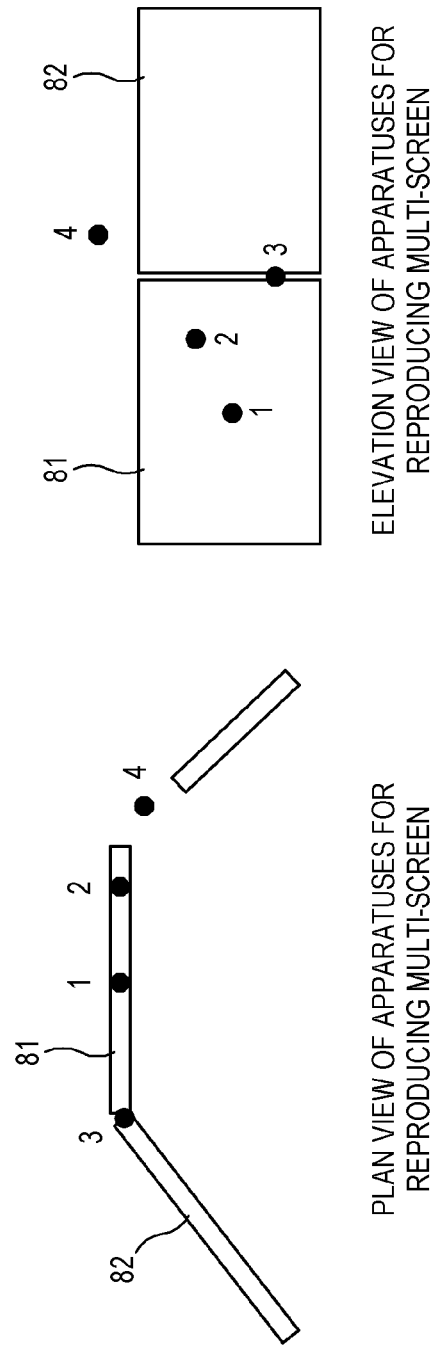
FIG. 20 illustrates an example of setting a control reference point with regard to multi-screens, according to an embodiment.

As shown in FIG. 20, the display apparatus 20 may first set the control reference point 850 with regard to the multi-screens 81, 82, 83, . . . . The control reference point 850 refers to a reference position for controlling the 360-degree image 950 with regard to the multi-screens 81, 82, 83, . . . , and any of various positions inside or outside the multi-screens 81, 82, 83, . . . may be set as the control reference point 850.

For example, the control reference point 850 may be positioned at the center of the multi-screens 81, 82, 83, . . . , or may be set as the center point 1 of the screen 81 convenient for a user to do watching or controlling.

Further, the control reference point 850 may be set as a dot 2 positioned at an off-center location within an inside region of one screen 81 from among the multi-screens 81, 82, 83, . . . .

Alternatively, the control reference point 850 may be set as a dot 3 positioned in a connection portion, for example, a bezel, between the multi-screens 81, 82, 83, . . . or may be set as a virtual dot 4 outside the screen when the screens are not in contact with each other.

Further, the control reference point 850 may be set based on an angle directly input by a user, or may be set based on an angle that corresponds to a position of a recognized user's action or eye direction. Further, in the state that a sensor is attached to each screen, when a user inputs a signal to a desired screen via a remote controller, the center point of the corresponding screen may be set as the control reference point 850.

Further, sensors may be attached to the multi-screens 81, 82, 83, . . . at regular angular intervals, and the control reference point 850 may be set as a desired angle based on a user input. In this case, the control reference point 850 may be set based on an angle between the sensors and further based on the strength of the signals received in the sensors.

Figure 21:
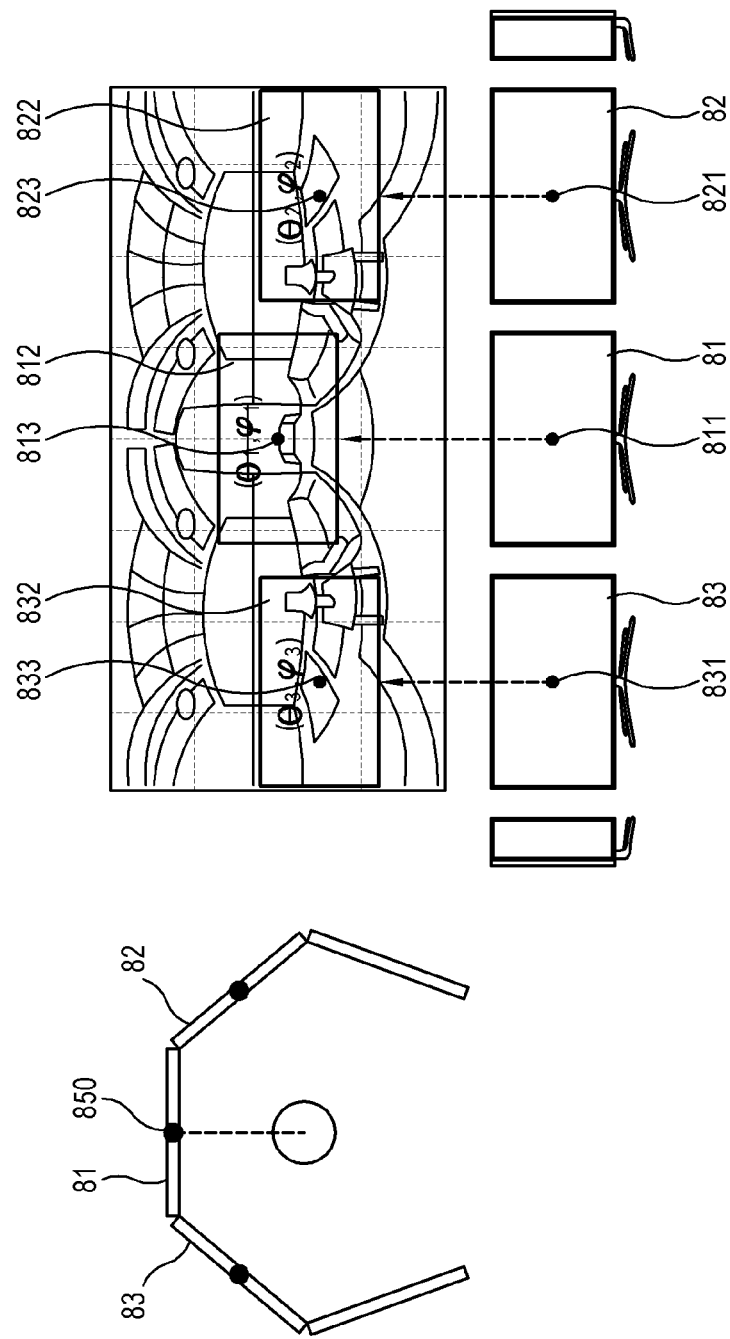
FIG. 21 illustrates an example of setting a control reference point at a center point of a main screen, according to an embodiment.

In the example illustrated in FIG. 21, the display apparatus 20 sets the center point 811 of the main screen 81 as the control reference point 850, and determines the respective projection centers 813, 823, 833, . . . according to the screens 81, 82, 83, . . . .

In this case, the projection center 813 of the main screen 81 is aligned with the control reference point 850, and the projection centers 823, 833, . . . of the other screens 82, 83, . . . are calculated with respect to the control reference point 850 and then aligned with the center points 821, 831 of the screens 82, 83, . . . .

Figure 22:
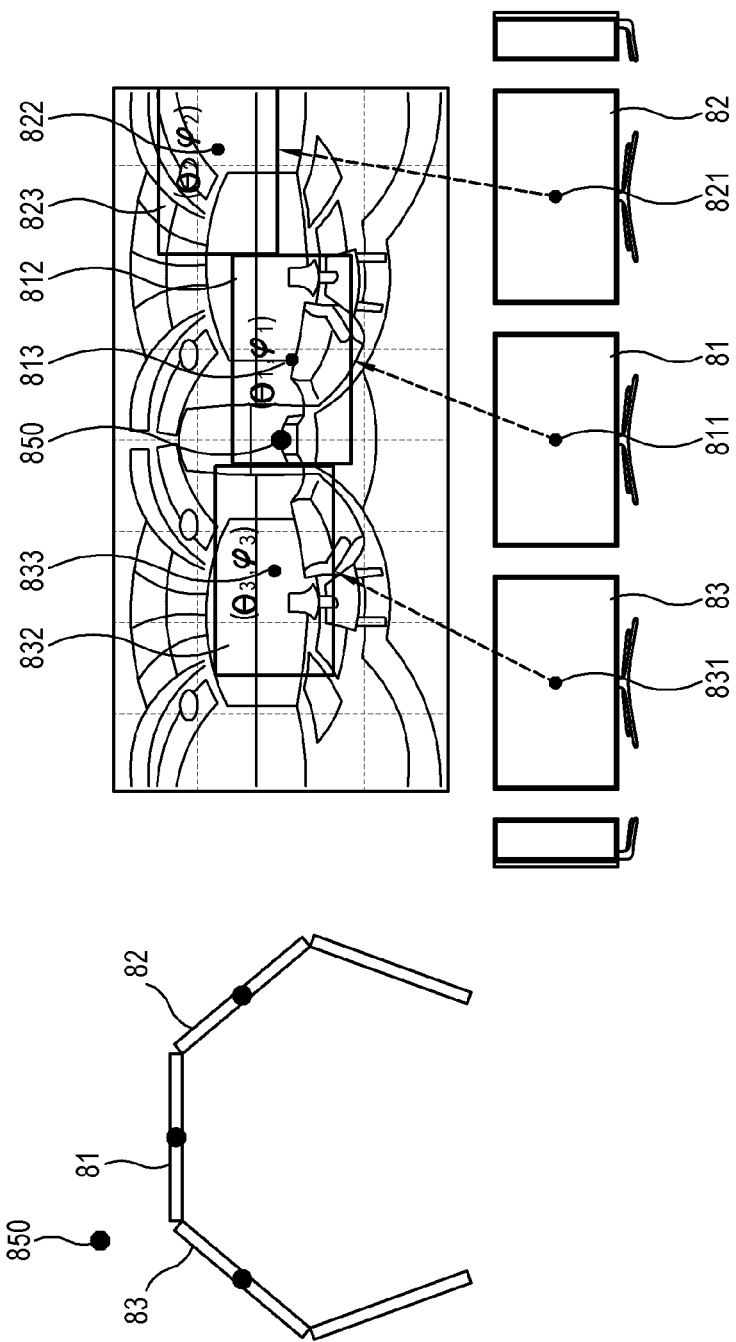
FIG. 22 illustrates an example of setting a control reference point in an outside region of a main screen, according to an embodiment.

In the example illustrated in FIG. 22, the display apparatus 20 sets the control reference point 850 to be positioned at an off-center location within an inside region or an outside of the screen 81, and determines the projection center 813, 823, 833, . . . according to the screens 81, 82, 83, . . . . In this case, the projection centers 813, 823, 833, . . . of all the screens 81, 82, 83, . . . are obtained with respect to the control reference point 850, and then aligned with the center point 811, 821 and 831 of the respective screens 81, 82, 83, . . . .

In the example illustrated in FIG. 29, the projection centers 813, 823, 833 and 844 respectively displayed on each of the multi-screens 81, 82, 83 and 84 from the virtual sphere 121 may be calculated using the angular distances (Δθ, ΔΦ) of the center points 811, 821, 831 and 841 of the respective screens 81, 82, 83 and 84 with respect to the control reference point 850.

For example, when the viewpoint corresponding to the control reference point 850 is ($\theta_0$, $\Phi_0$), the viewpoint corresponding to the center point 821 of the screen 2, i.e., the projection center 823, is calculated by ($\theta_0+\Delta\theta$, $\Phi_0+\Delta\Phi$).

By such a method, the control reference point 850 is set with respect to the multi-screens 81, 82, 83 and 84, and thus the viewpoint of each screen is obtained from the virtual sphere 121 formed by connecting the center points of the screens selected by a user.

As described above, according to the present disclosure, it is possible to control the 360-degree image on the multi-screens.

Further, according to the present disclosure, when the 360-degree image is controlled on the multi-screens, regions displayed on the screens can be viewed without an overlapping or lost region even though the viewpoint and the view angle are changed.

Although a few embodiments have been shown and described, it will be appreciated by persons having ordinary skill in the art that changes may be made in these embodiments without departing from the principles and spirit of the present disclosure, the scope of which is defined in the appended claims and their equivalents.

What is claimed is:

1. A display apparatus comprising:
a display; and
a processor configured:
to obtain a plurality of first view angle ranges based on a number of a plurality of screens and a position at which a first screen that corresponds to the display apparatus is arranged,
to produce, from a 360-degree image, a first plurality of split images to be arranged along a first great circle of a sphere shape, based on a first viewpoint that corresponds to a first user input and the plurality of first view angle ranges,
to produce a first projection image to be displayed on the display from a first split image from among the first plurality of split images,
to control the display to display the first projection image,
in response to a second user input for changing a viewpoint from the first viewpoint to a second viewpoint, to identify a second great circle of the sphere shape having a rotation angle from the first great circle, based on the second viewpoint,
to produce, from the 360-degree image, a second plurality of split images arranged along the second great circle,
to produce a second projection image to be displayed on the display from a second split image from among the second plurality of split images, and
to control the display to display the second projection image,
wherein a center point of the first great circle is same as a center point of the second great circle, and
wherein the first plurality of split images corresponds to the plurality of screens, and the first split image corresponds to the first screen.

2. The display apparatus according to claim 1, wherein the processor is further configured to transmit control information based on the second user input to each of a plurality of display apparatuses corresponding to the plurality of screens, and
wherein the control information comprises at least one from among information about a change in a view angle, information about a pitching rotation angle, and information about a yawing rotation angle.

3. The display apparatus according to claim 1, wherein the processor is further configured to set a control reference point with regard to the first screen based on a third user input, and to obtain a center point of a third projection image displayed on a second screen based on a set position of the control reference point.

4. The display apparatus according to claim 3, wherein the processor is further configured to change a position at which the third projection image is displayed based on information about a change of the first viewpoint and an angular distance of the center point of the second projection image from the control reference point when the third projection image is subjected to a pitching rotation or a yawing rotation based on a fourth user input.

5. The display apparatus according to claim 1, wherein the processor is further configured to adjust a view angle of a third projection image displayed on a second screen based on a predetermined total view angle range that corresponds to the plurality of screens, when the first projection image is subjected to zoom control based on a fifth user input.

6. A display apparatus comprising:
a display; and
a processor configured:
to select a plurality of display apparatuses to be connected on a network based on a first user input,
to obtain a plurality of first view angle ranges based on a number of a plurality of screens of the plurality of display apparatuses and a position at which a first screen that corresponds to the display apparatus is arranged,
to produce, from a 360-degree image, a first plurality of split images to be arranged along a first great circle of a sphere shape corresponding to viewpoints of the plurality of screens based on a second user input and the plurality of first view angle ranges,
to map each of the produced first plurality of split images to the sphere shape,
in response to a viewpoint control, to identify a second great circle of the sphere shape having a rotation angle from the first great circle,
to produce, from the 360-degree image, a second plurality of split images arranged along the second great circle, and
to map each of the produced second plurality of split images to the sphere shape,
wherein a center point of the first great circle is same as a center point of the second great circle.

7. The display apparatus according to claim 6, wherein the processor is further configured to display a first user interface for setting a respective position of the sphere shape to which each corresponding one of the first plurality of split images is mapped.

8. The display apparatus according to claim 6, wherein the processor is further configured to display a second user interface for showing images of apparatuses arranged in a surrounding space of a user, and to select the plurality of display apparatuses based on the first user input to the second user interface.

9. A non-transitory computer readable storage medium storing a computer program comprising an instruction that, when executed by a processor, causes a computer to perform a method comprising:
  obtaining a plurality of first view angle ranges based on a number of a plurality of screens and a position at which a first screen that corresponds to a display apparatus is arranged,
  producing, from a 360-degree image, a first plurality of split images to be arranged along a first great circle of a sphere shape based on a first viewpoint that corresponds to a first user input and the plurality of first view angle ranges,
  producing a first projection image to be displayed from a first split image from among the first plurality of split images,
  displaying the first projection image,
  in response to a second user input for changing a viewpoint from the first viewpoint to a second viewpoint, identifying a second great circle of the sphere shape having a rotation angle from the first great circle, based on the second viewpoint,
  producing, from the 360-degree image, a second plurality of split images arranged along the second great circle of the sphere shape,
  producing a second projection image to be displayed from a second split image from among the second plurality of split images, and
  displaying the second projection image,
  wherein a center point of the first great circle is same as a center point of the second great circle, and
  wherein the first plurality of split images corresponds to the plurality of screens, and wherein the first split image corresponds to the first screen.

10. A server comprising:
  a communication interface configured to communicate with a plurality of display apparatuses; and
  a processor configured:
    to obtain a plurality of first view angle ranges based on a number of a plurality of screens of the plurality of display apparatuses,
    to control the communication interface to produce, from a 360-degree image, a first plurality of split images to be arranged along a first great circle of a sphere shape based on the plurality of first view angle ranges,
    to transmit each respective one of the produced first plurality of split images to a corresponding one of the plurality of display apparatuses,
    in response to a viewpoint control, to identify a second great circle of the sphere shape having a rotation angle from the first great circle,
    to produce, from the 360-degree image, a second plurality of split images arranged along the second great circle, and
    to transmit each respective one of the produced second plurality of split images to a corresponding one of the plurality of display apparatuses,
  wherein a center point of the first great circle is same as a center point of the second great circle.

11. The server according to claim 10, wherein the processor is further configured to receive information about the number of the plurality of screens that correspond to the plurality of display apparatuses and a respective position at which each of the first plurality of split images is arranged, and to produce the first plurality of split images based on the received information.

12. A non-transitory computer readable storage medium storing a computer program comprising an instruction that, when executed by a processor, causes a computer to implement a method comprising:
  obtaining a plurality of first view angle ranges based on a number of a plurality of screens,
  producing, from a 360-degree image, a first plurality of split images to be arranged along a first great circle of a sphere shape based on the plurality of first view angle ranges,
  transmitting each of the produced first plurality of split images to a corresponding display apparatus,
  in response to a viewpoint control, identifying a second great circle of the sphere shape having a rotation angle from the first great circle,
  producing, from the 360-degree image, a second plurality of split images arranged along the second great circle, and
  transmitting each of the produced second plurality of split images to a corresponding display apparatus,
  wherein a center point of the first great circle is same as a center point of the second great circle.

13. A method of controlling a display apparatus, the method comprising:
  obtaining a plurality of first view angle ranges based on a number of a plurality of screens and a position at which a first screen that corresponds to the display apparatus is arranged;
  producing, from a 360-degree image, a first plurality of split images to be arranged along a first great circle of a sphere shape, based on a first viewpoint that corresponds to a first user input and the plurality of first view angle ranges;
  producing a first projection image to be displayed on a display from a first split image from among the first plurality of split images;
  controlling the display to display the first projection image;
  in response to a viewpoint control for changing a viewpoint from the first viewpoint to a second viewpoint, to identify a second great circle of the sphere shape having a rotation angle from the first great circle, based on the second viewpoint,
  producing, from the 360-degree image, a second plurality of split images arranged along the second great circle;
  producing a second projection image to be displayed on the display from a second split image from among the second plurality of split images; and
  controlling the display to display the second projection image,
  wherein a center point of the first great circle is same as a center point of the second great circle, and
  wherein the first plurality of split images corresponds to the plurality of screens, and wherein the first split image corresponds to the first screen.

14. A method of controlling a display apparatus, the method comprising:
  selecting a plurality of display apparatuses to be connected on a network based on a first user input;
  obtaining a plurality of first view angle ranges based on a number of a plurality of screens and a position at which a first screen that corresponds to the display apparatus from among the plurality of display apparatuses is arranged;
  producing, from a 360-degree image, a first plurality of split images to be arranged along a first great circle of a sphere shape corresponding to viewpoints of screens of the plurality of display apparatuses based on a second user input and the plurality of first view angle ranges;
mapping each of the produced first plurality of split images to the sphere shape;
in response to a third user input, to identify a second great circle of the sphere shape having a rotation angle from the first great circle;
producing, from the 360-degree image, a second plurality of split images arranged along the second great circle; and
mapping each of the produced second plurality of split images to the sphere shape,
wherein a center point of the first great circle is same as a center point of the second great circle.

15. The method according to claim 14, further comprising displaying a first user interface for setting a respective position of the sphere shape to which each corresponding one of the first plurality of split images is mapped, based on a fourth user input.

16. The method according to claim 14, further comprising:
displaying a second user interface for showing images of apparatuses arranged in a surrounding space of a user; and
selecting the plurality of display apparatuses based on the first user input to the second user interface.

17. A method of controlling a server, the method comprising:
obtaining a plurality of first view angle ranges based on a number of a plurality of screens that correspond to a plurality of display apparatuses,
producing, from a 360-degree image, a first plurality of split images to be arranged along a first great circle of a sphere shape based on the plurality of first view angle ranges;
transmitting each respective one of the produced first plurality of split images to a corresponding one of the plurality of display apparatuses;
in response to a viewpoint control, to identify a second great circle of the sphere shape having a rotation angle from the first great circle,
producing, from the 360-degree image, a second plurality of split images arranged along the second great circle; and
transmitting each respective one of the produced second plurality of split images to a corresponding one of the plurality of display apparatuses,
wherein a center point of the first great circle is same as a center point of the second great circle.

18. The method according to claim 17, further comprising:
receiving information about the number of the plurality of screens and a respective position at which each of the first plurality of split images is arranged,
wherein the producing the first plurality of split images is based on the number of the plurality of screens and the respective position at which each of the first plurality of split images is arranged, and
wherein the producing the second plurality of split images is based on the number of the plurality of screens and the respective position at which each of the first plurality of split images is arranged.

19. The display apparatus according to claim 1, wherein the plurality of screens corresponds to a plurality of display apparatuses, and
wherein the processor is further configured to control transmission of a fourth split image from among the first plurality of split images to a second display apparatus from among the plurality of display apparatuses.

20. The display apparatus according to claim 6, wherein the processor is further configured to control transmission of a second split image from among the first plurality of split images to a second display apparatus from among the plurality of display apparatuses.

21. The method according to claim 13, wherein the display apparatus is one from among a plurality of display apparatuses, and
wherein the method further comprises transmitting a third split image from among the first plurality of split images to a second display apparatus from among the plurality of display apparatuses.

22. The method according to claim 14, wherein the method further comprises transmitting a second split image from among the first plurality of split images to a second display apparatus from among the plurality of display apparatuses.

* * * * *